United States Patent
Ogura et al.

(10) Patent No.: US 8,732,815 B2
(45) Date of Patent: May 20, 2014

(54) SYSTEM, METHOD OF AUTHENTICATING INFORMATION MANAGEMENT, AND COMPUTER-READABLE MEDIUM STORING PROGRAM

(75) Inventors: Takao Ogura, Kawasaki (JP); Hitoshi Ueno, Kawasaki (JP); Makoto Kubota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 47 days.

(21) Appl. No.: 13/356,800

(22) Filed: Jan. 24, 2012

(65) Prior Publication Data

US 2012/0240214 A1 Sep. 20, 2012

(30) Foreign Application Priority Data

Mar. 16, 2011 (JP) .................................. 2011-057440

(51) Int. Cl.
  *G06F 9/00* (2006.01)
(52) U.S. Cl.
  USPC ................................................. 726/12; 726/8
(58) Field of Classification Search
  USPC .......................................................... 726/12
  See application file for complete search history.

(56) References Cited

U.S. PATENT DOCUMENTS

| 5,483,652 A * | 1/1996 | Sudama et al. ................ 709/201 |
| 2005/0289643 A1* | 12/2005 | Sato et al. .......................... 726/4 |
| 2006/0236383 A1* | 10/2006 | Cam-Winset et al. ............ 726/8 |
| 2012/0195412 A1* | 8/2012 | Smith ......................... 379/88.13 |

FOREIGN PATENT DOCUMENTS

| JP | 08-335208 A | 12/1996 |
| JP | 2002-132727 A | 5/2002 |
| JP | 2005-011098 A | 1/2005 |
| JP | 2010-003119 A | 1/2010 |

* cited by examiner

*Primary Examiner* — Kambiz Zand
*Assistant Examiner* — Ghodrat Jamshidi
(74) *Attorney, Agent, or Firm* — Fujitsu Patent Center

(57) ABSTRACT

In response to a service request designating a service identifier, a proxy server reads out at least two processing system identifiers corresponding to the designated service identifier from a first storage unit, and transmits an acquisition request containing the read-out at least two processing identifiers to a management server. The management server acquires respective authentication information items corresponding to the at least two processing identifiers contained in the received acquisition request from a second storage unit, and transmits the acquired authentication information items to the proxy server. The proxy server transmits user authentication requests for respective processing systems containing the received authentication information items to the at least two processing systems, respectively.

7 Claims, 23 Drawing Sheets

FIG. 8

211 CLOUD ASSOCIATION
TABLE

| IDP_URL | SERVICE PROVIDER |
|---|---|
| http://IDP0.com | COMPANY F |
| https://IDP1.com | COMPANY X |
| https://IDP2.com | COMPANY Y |
| ⋮ | ⋮ |

FIG. 9

212 AUTHENTICATION INFORMATION TABLE GROUP

212a AUTHENTICATION INFORMATION TABLE

| TENANT ID | USER ID | COMPANY X ID | COMPANY X PASSWORD |
|---|---|---|---|
| Te-A | 00930428 | x_ID | x_PW |
| Te-A | 00930429 | x_ID | x_PW |
| ⋮ | ⋮ | ⋮ | ⋮ |

212b AUTHENTICATION INFORMATION TABLE

| TENANT ID | USER ID | COMPANY Y ID | COMPANY Y PASSWORD |
|---|---|---|---|
| Te-A | 00930428 | y_ID | y_PW |
| Te-A | 00930429 | y_ID | y_PW |
| ⋮ | ⋮ | ⋮ | ⋮ |

111 COLLABORATION SERVICE TABLE

| TENANT ID | SERVICE URL | IDP_URL | LINKED COLLABORATOR IDP_URL |
|---|---|---|---|
| Te-A | http://Ap1.c.com | https://IDP1.com | https://IDP2.com |
| Te-A | http://Ap2.c.com | https://IDP3.com | https://IDP4.com |
| ⋮ | ⋮ | ⋮ | ⋮ |

FIG. 11

AUTHENTICATION
INFORMATION
MANAGEMENT TABLE 112

| TENANT ID | USER ID | IDP_URL | ID | PW |
|---|---|---|---|---|
| Te-A | 00930428 | https://IDP1.com | x_ID | x_PW |
| Te-A | 00930428 | https://IDP2.com | y_ID | y_PW |

SYSTEM, METHOD OF AUTHENTICATING INFORMATION MANAGEMENT, AND COMPUTER-READABLE MEDIUM STORING PROGRAM

CROSS-REFERENCE TO RELATED APPLICATION

This application is based upon and claims the benefit of priority of the prior Japanese Patent Application No. 2011-057440, filed on Mar. 16, 2011, the entire contents of which are incorporated herein by reference.

FIELD

The embodiments discussed herein are related to a system that manages authentication information used for proxy authentication, a method of authenticating information management, and a computer-readable medium storing a program.

BACKGROUND

In a case where a user accesses an application server (hereinafter referred to as the AP server) which provides a service by executing an application program, there is a method of proxy authentication in which a request for authentication is made on behalf of the user. In an apparatus that carries out proxy authentication, pre-authentication of a user is performed e.g. according to a combination of a user ID and a password (authentication information). Then, the user properly authenticated in the pre-authentication is authenticated by an AP server to be used by the user using authentication information registered in advance. This makes it possible to save the user the time and trouble of inputting the authentication information to each of a plurality of AP servers. Further, in an organization, such as a company, an administrator of the system manages authentication information for using AP servers, and performs the setting of proxy authentication, which makes it unnecessary for each user to take the trouble of managing authentication information for AP servers on an AP server-by-AP server basis.

The above-described function of proxy authentication includes a type in which a proxy authentication function is provided e.g. on a terminal device (terminal proxy authentication). In a case where terminal proxy authentication is introduced into an organization, such as a company, an administrator of the system is caused to distribute authentication information to terminal devices of users who are allowed to use a service provided by an AP server. However, in terminal proxy authentication, authentication information is provided to all of the terminal devices whenever the authentication information is registered, deleted, or changed. Therefore, if the number of users increases, the burden on the administrator in providing authentication information becomes too large. Further, if a browser or the like of the terminal device is caused to store authentication information, there is a risk of leakage of authentication information which might be caused by spyware or computer viruses.

To cope with such problems, it is envisaged to perform proxy authentication by centralized administrative control of authentication information in a server provided separately from terminal devices. For example, there has been proposed a technique of performing proxy authentication in an SSO (Single Sign-On) server. Further, there has been proposed a technique of performing proxy authentication in a proxy server. (See Japanese Laid-open Patent Publication No. 2010-003119 and Japanese Laid-open Patent Publication No. 2005-011098)

However, conventionally, the efficiency of processing in performing proxy authentication has been insufficient. Therefore, there is a problem that when the number of users who use proxy authentication processing becomes large, processing load on the apparatus that carries out proxy authentication becomes too large.

SUMMARY

According to an aspect of the invention, there is provided a system including a proxy server configured to perform, as a proxy, a procedure of user authentication by at least two processing systems that perform processing for a service in collaboration with each other, and a management server configured to manage authentication information items for user authentication by the at least two processing systems, wherein the proxy server includes: a first memory configured to store a correspondence relationship between a service identifier identifying a service, and processing system identifiers identifying at least two processing systems that perform processing for the service in collaboration with each other, respectively; and one or more first processors configured to perform a first procedure including, responsive to a service request designating a service identifier, reading out at least two processing system identifiers which correspond to the designated service identifier, from the first memory, and transmitting an acquisition request containing the read-out at least two processing system identifiers to the management server, wherein the management server includes: a second memory configured to store a correspondence relationship between processing system identifiers identifying processing systems, respectively, and authentication information items used for user authentication by the processing systems, respectively; and one or more second processors configured to perform a second procedure including: receiving the acquisition request from the proxy server; and acquiring, from the second memory, the authentication information items which correspond to the at least two processing system identifiers contained in the received acquisition request, respectively, and transmitting the acquired authentication information items to the proxy server, and wherein the first procedure further includes: receiving, from the management server, the authentication information items which correspond to the at least two processing system identifiers, respectively; and transmitting user authentication requests containing the received authentication information items for the processing systems to the at least two processing systems, respectively.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 illustrates an example of a data structure of a cloud association table;

FIG. 9 illustrates an example of a data structure of an authentication information table;

FIG. 10 illustrates an example of a data structure of a collaboration service table;

FIG. 11 illustrates an example of a data structure of an authentication information management table;

DESCRIPTION OF EMBODIMENTS

Figure 1:
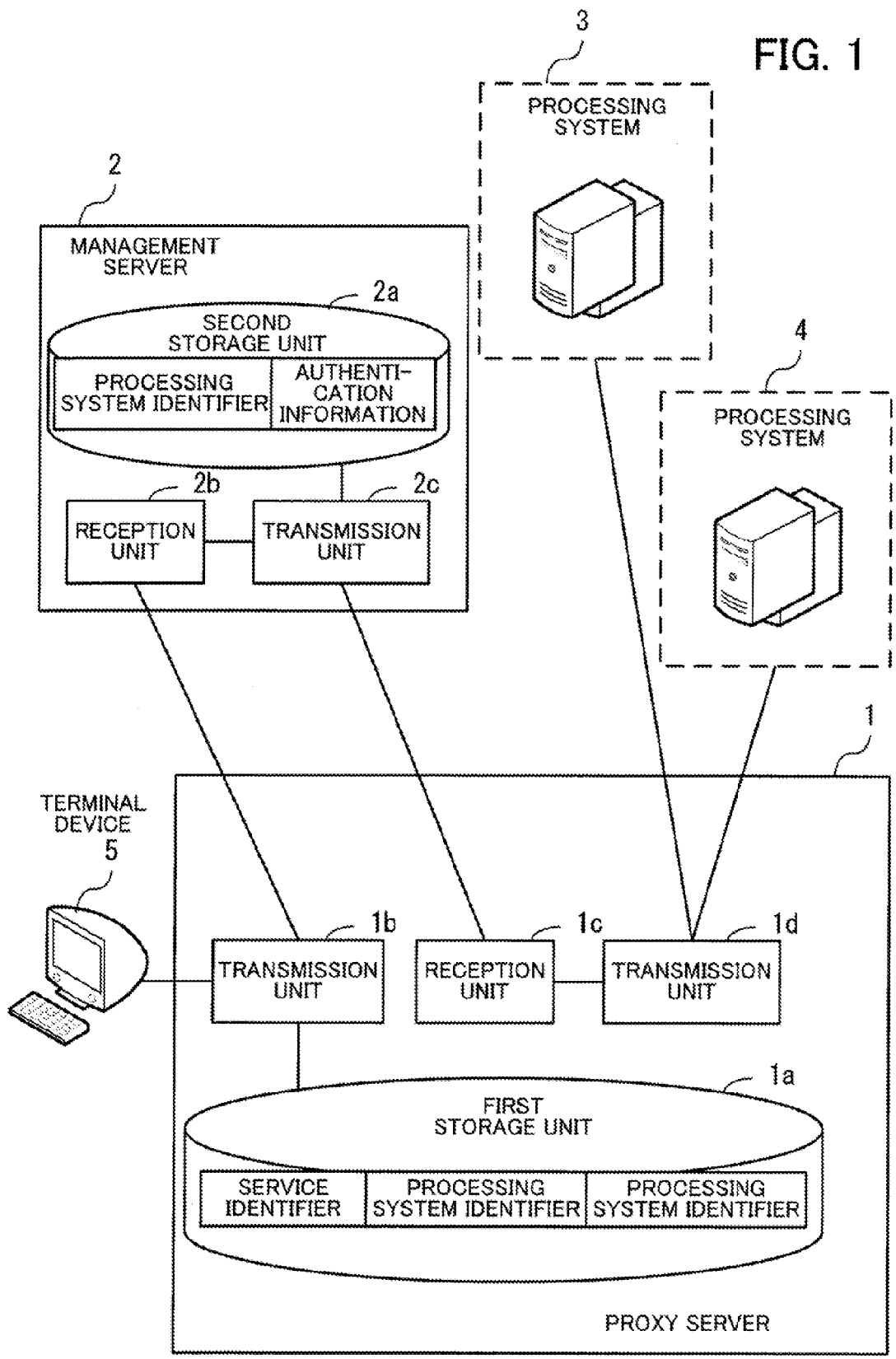
FIG. 1 illustrates an example of the functional configuration of a system according to a first embodiment.

Several embodiments will be described below with reference to the accompanying drawings, wherein like reference numerals refer to like elements throughout. Note that the embodiments described hereafter can be executed by combining a plurality of them insofar as the resulting combination does not contain a contradiction.

[a] First Embodiment

The first embodiment is configured such that a proxy server that carries out proxy authentication and a management server that manages authentication information are separately provided, and the frequency of communication between the proxy server and the management server is reduced with a view to improving the processing efficiency. The management server is e.g. a repository server that manages authentication information of an identity provider (IDP).

By separately providing the proxy server and the management server, there is no need to carry out processing necessary for managing authentication information in the proxy server, which reduces load on the proxy server. As a consequence, the processing for proxy authentication can be made more efficient. Further, the management server can perform centralized management of authentication information, and hence it is possible to reduce the work load on the administrator responsible for processing for changing authentication information, compared with terminal proxy authentication. Further, authentication information for connection to an application server is in the management server, and hence it is possible to reduce the possibility of leakage of authentication information.

However, when the proxy server and the management server are separately provided, it occurs that whenever an application server requests an input of authentication information in response to a service request from a user, the proxy server queries the management server about authentication information. Therefore, if the number of users becomes enormous, this causes communications for a query about authentication information and a response to the query to frequently occur between the proxy server and the management server, which lowers the processing efficiency. To eliminate such an inconvenience, in the first embodiment, the frequency of communication between the proxy server and the management server is reduced to thereby improve the processing efficiency.

As an example of a situation where proxy authentication is performed, there is a case where when receiving a service realized by collaboration processing by a plurality of application servers, an input of authentication information is requested from each of the plurality of application servers. In this case, proxy authentication to the plurality of application servers is performed in response to one service request sent from a terminal device used by a user. To this end, in the first embodiment, when the proxy server that carries out proxy authentication receives a service request for processing involving proxy authentication to the plurality of application servers, the proxy server collectively acquires a plurality of authentication information items to be used for the proxy authentication from the management server. This makes it possible to reduce the frequency of communication between the proxy server and the management server.

FIG. 1 illustrates an example of the functional configuration of a system according to the first embodiment. A proxy server 1 carries out, as a proxy, a procedure of user authentication by two processing systems 3 and 4 that perform processing for a service in collaboration with each other. A management server 2 manages authentication information for user authentication by the two processing systems 3 and 4. The processing systems 3 and 4 are e.g. computer systems each having one or more servers. The processing systems 3 and 4 each include e.g. a function of executing processing in response to a service request and a function of performing user authentication in response to a user authentication request. Note that the function of executing processing and the function of performing user authentication may be implemented in separate servers, or may be implemented in one server.

The proxy server 1 includes a first storage unit 1a, transmission unit 1b, reception unit 1c, and transmission unit 1d.

The first storage unit 1a stores a correspondence relationship between a service identifier identifying a service, and processing system identifiers for respectively identifying the two processing systems 3 and 4 that process the service in collaboration with each other.

The transmission unit 1b reads out, in response to a service request designating a service identifier, the two processing system identifiers corresponding to the designated service identifier from the first storage unit 1a. Then, the transmission unit 1b transmits an acquisition request containing the read two processing system identifiers to the management server 2. The service request is input e.g. from a terminal device 5.

The reception unit 1c receives respective authentication information items corresponding to the two processing system identifiers from the management server 2.

The transmission unit 1d transmits user authentication requests for respective processing systems, each of which contains the received authentication information, to the two processing systems 3 and 4, respectively.

The management server 2 includes a second storage unit 2a, reception unit 2b, and transmission unit 2c.

The second storage unit 2a stores a correspondence relationship between a processing system identifier identifying a processing system and authentication information used for user authentication to the processing system.

The reception unit 2b receives an acquisition request from the proxy server 1.

The transmission unit 2c acquires respective authentication information items corresponding to the two processing system identifiers contained in the received acquisition request from the second storage unit 2a, and transmits the acquired authentication information items to the proxy server 1.

The transmission unit 1b, the reception unit 1c, and the transmission unit 1d of the proxy server 1 are realized by a CPU (Central Processing Unit) included in the proxy server 1. Further, the first storage unit 1a included in the proxy server 1 is realized e.g. by a RAM (Random Access Memory) or a hard disk drive (HDD) included in the proxy server 1. The reception unit 2b and the transmission unit 2c of the management server 2 are realized by a CPU included in the management server 2. Further, the second storage unit 2a included in the management server 2 is realized e.g. by a RAM or a HDD included in the management server 2.

Further, lines connecting between the respective elements illustrated in FIG. 1 indicate some of communication paths, and communication paths other than the illustrated communication paths may be set.

Next, a description will be given of a process in the system illustrated in FIG. 1.

Figure 2:
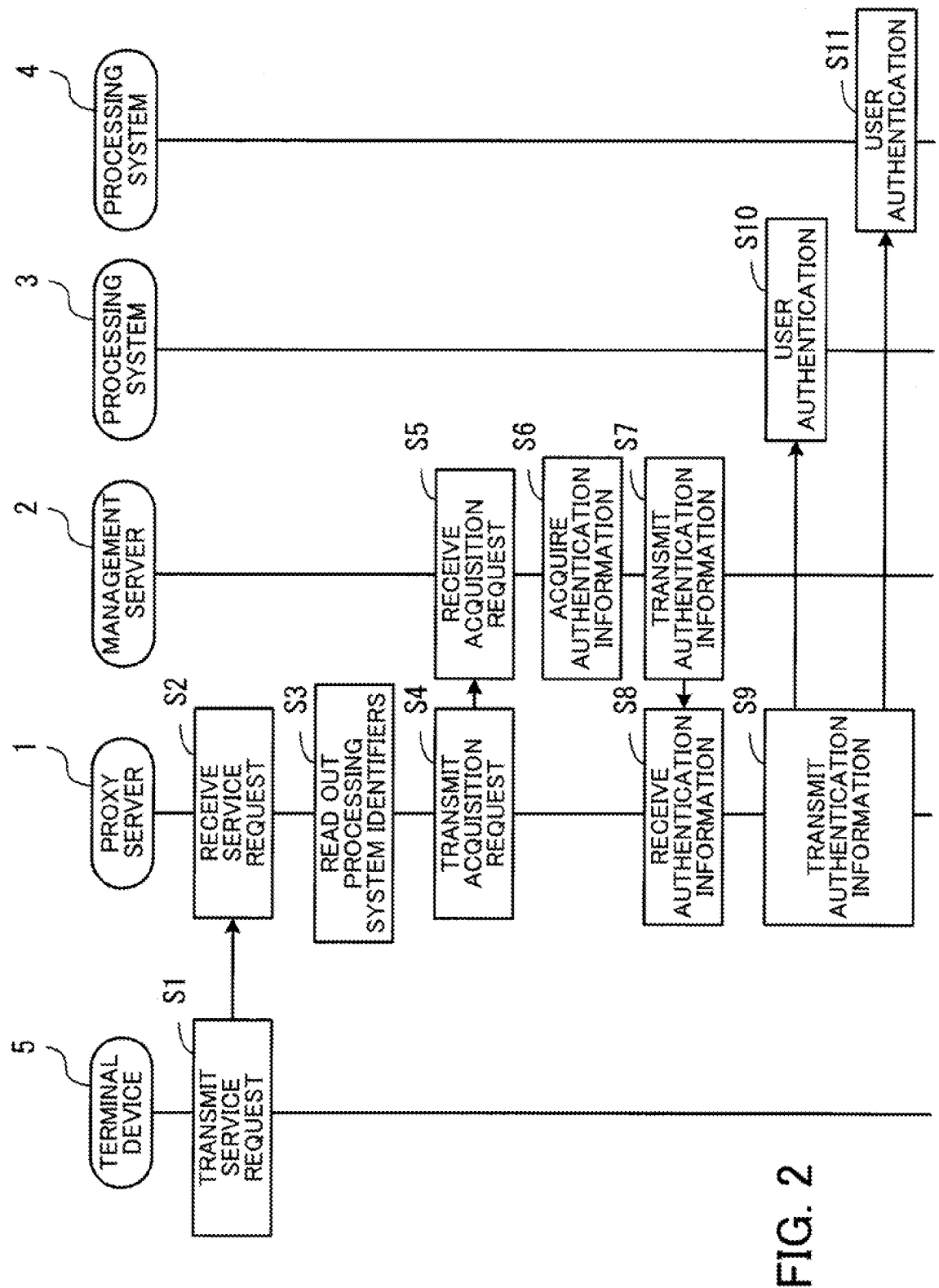
FIG. 2 is a sequence diagram of an example of a process procedure executed by a system according to a second embodiment.

FIG. 2 is a sequence diagram of an example of processing in the system according to the first embodiment. The process illustrated in FIG. 2 will be described hereinafter in order of step number.

[step S1] The terminal device 5 transmits a service request. For example, the terminal device 5 transmits a service request according to an input from a user. The service request contains a service identifier identifying a service.

[step S2] The transmission unit 1b of the proxy server 1 receives the service request transmitted from the terminal device 5.

[step S3] The transmission unit 1b of the proxy server 1 reads out two processing system identifiers corresponding to the service identifier designated in the service request from the first storage unit 1a.

[step S4] The transmission unit 1b of the proxy server 1 transmits an acquisition request to the management server 2. The acquisition request contains the two processing system identifiers read from the first storage unit 1a.

[step S5] The reception unit 2b of the management server 2 receives the acquisition request transmitted from the proxy server 1. The reception unit 2b transfers the received acquisition request to the transmission unit 2c.

[step S6] The transmission unit 2c of the management server 2 acquires respective authentication information items corresponding to the two processing system identifiers contained in the received acquisition request from the second storage unit 2a.

[step S7] The transmission unit 2c of the management server 2 transmits the acquired authentication information items to the proxy server 1.

[step S8] The reception unit 1c of the proxy server 1 receives the respective authentication information items corresponding to the two processing system identifiers transmitted from the management server 2.

[step S9] The transmission unit 1d of the proxy server 1 transmits user authentication requests for the respective processing systems 3 and 4, which contains the respective received authentication information items, to the two processing systems 3 and 4, respectively.

[step S10] The processing system 3 performs user authentication according to the received user authentication request, based on the authentication information contained in the user authentication request.

[step S11] The processing system 4 performs user authentication according to the received user authentication request, based on the authentication information contained in the user authentication request.

Figure 3:
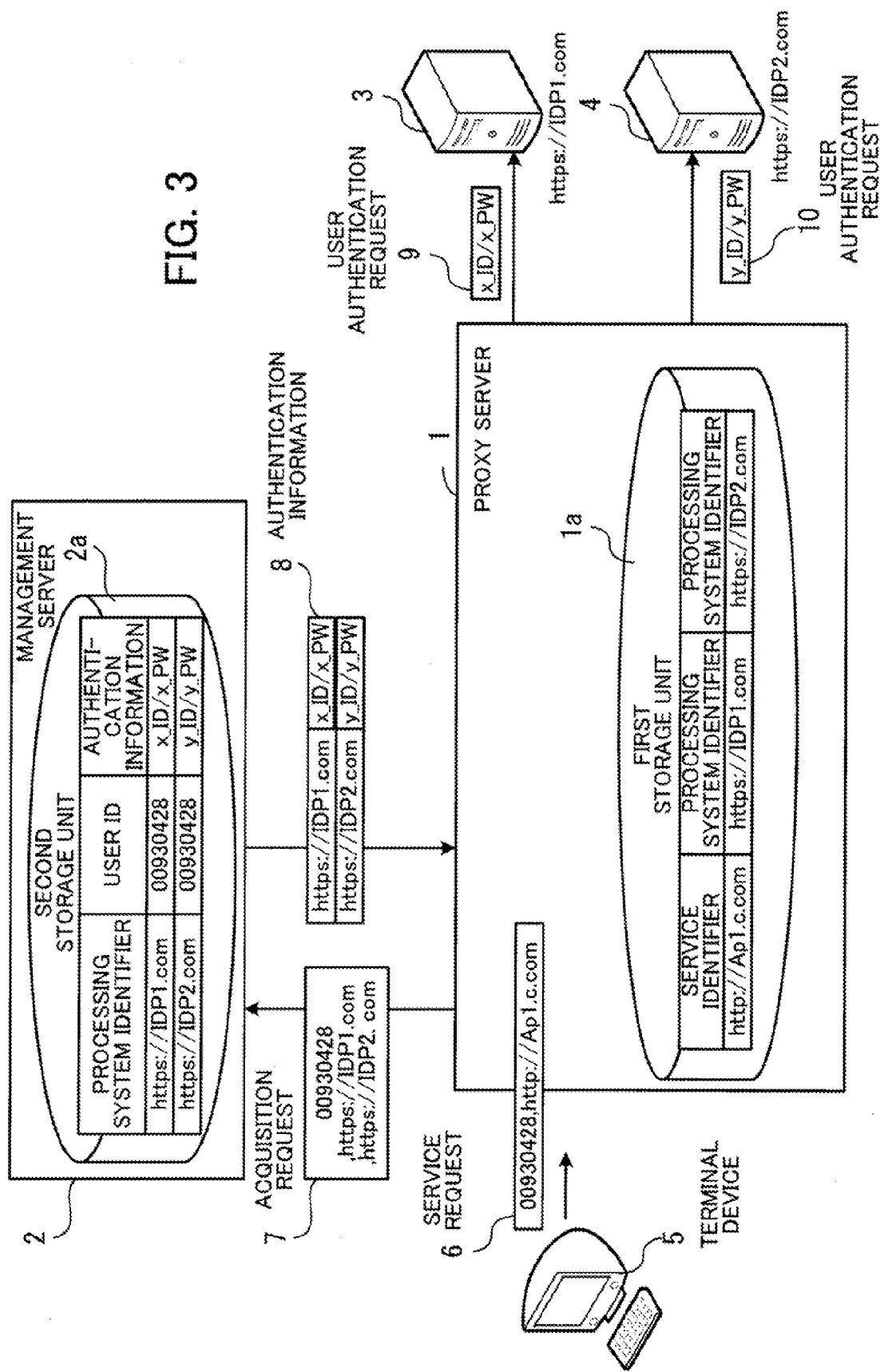
FIG. 3 illustrates an example of proxy authentication according to the first embodiment.

FIG. 3 illustrates an example of proxy authentication according to the first embodiment. In the example illustrated in FIG. 3, a service request 6 containing a user ID "00930428" and a service identifier "http://Ap1.c.com" is transmitted from the terminal device 5. The service identifier is e.g. a URL (Uniform Resource Locator) of an application server in one of the processing systems.

In the proxy server 1 having received the service request 6, processing system identifiers corresponding to the service identifier indicated in the service request 6 are extracted from the first storage unit 1a. In the example illustrated in FIG. 3, the two processing system identifiers of "https://IDP1.com" and "https://IDP2.com" are extracted. For example, URLs of the servers that perform user authentication processing in the respective processing systems 3 and 4 are used as the respective processing system identifiers of the processing systems 3 and 4.

Then, an acquisition request 7 is transmitted from the proxy server 1 to the management server 2. The acquisition request 7 contains the user ID "00930428" indicated in the service request 6, and the two processing system identifiers "https://IDP1.com" and "https://IDP2.com" extracted from the first storage unit 1a.

The acquisition request 7 is received by the management server 2. In the management server 2, authentication information 8 items are acquired which correspond to respective combinations of the user ID and the processing system identifiers indicated in the acquisition request 7. In the example illustrated in FIG. 3, the authentication information "x_ID/x_PW" corresponding to the combination of the user ID "00930428" and the processing system identifier "https://IDP1.com" is acquired. Further, the authentication information "y_ID/y_PW" corresponding to the combination of the user ID "00930428" and the processing system identifier "https://IDP2.com" is also acquired. The authentication information items 8 acquired in the management server 2 are transmitted to the proxy server 1.

The authentication information items 8 are acquired by the proxy server 1. Then, the proxy server 1 transmits user authentication requests 9 and 10 containing respective associated ones of the acquired authentication information items 8 to the processing systems 3 and 4, respectively. For example, the user authentication request 9 containing the authentication information "x_ID/x_PW" associated with the processing system identifier "https://IDP1.com" is transmitted to a URL indicated by the processing system identifier "https://IDP1.com" as the destination address. Further, the user authentication request 10 containing the authentication information "y_ID/y_PW" associated with the processing system identifier "https://IDP2.com" is transmitted to a URL indicated by the processing system identifier "https://IDP2.com" as the destination address.

By the above-described processing, the authentication information items are sent to the two processing systems 3 and 4 that provide a service in collaboration, respectively, whereby user authentication is performed by each of the processing systems 3 and 4. At this time, the proxy server 1 has acquired the two authentication information items by one acquisition request to the management server 2. Therefore, compared with a case where authentication information is individually acquired from the management server 2 whenever an authentication request is sent from each of the processing systems 3 and 4, it is possible to reduce the frequency of communication between the proxy server 1 and the management server 2. As a consequence, the processing efficiency in proxy authentication is improved.

[b] Second Embodiment

Next, a description will be given of a second embodiment. The second embodiment provides an example of a system in which proxy authentication is performed in a gateway apparatus (GW).

Figure 4:
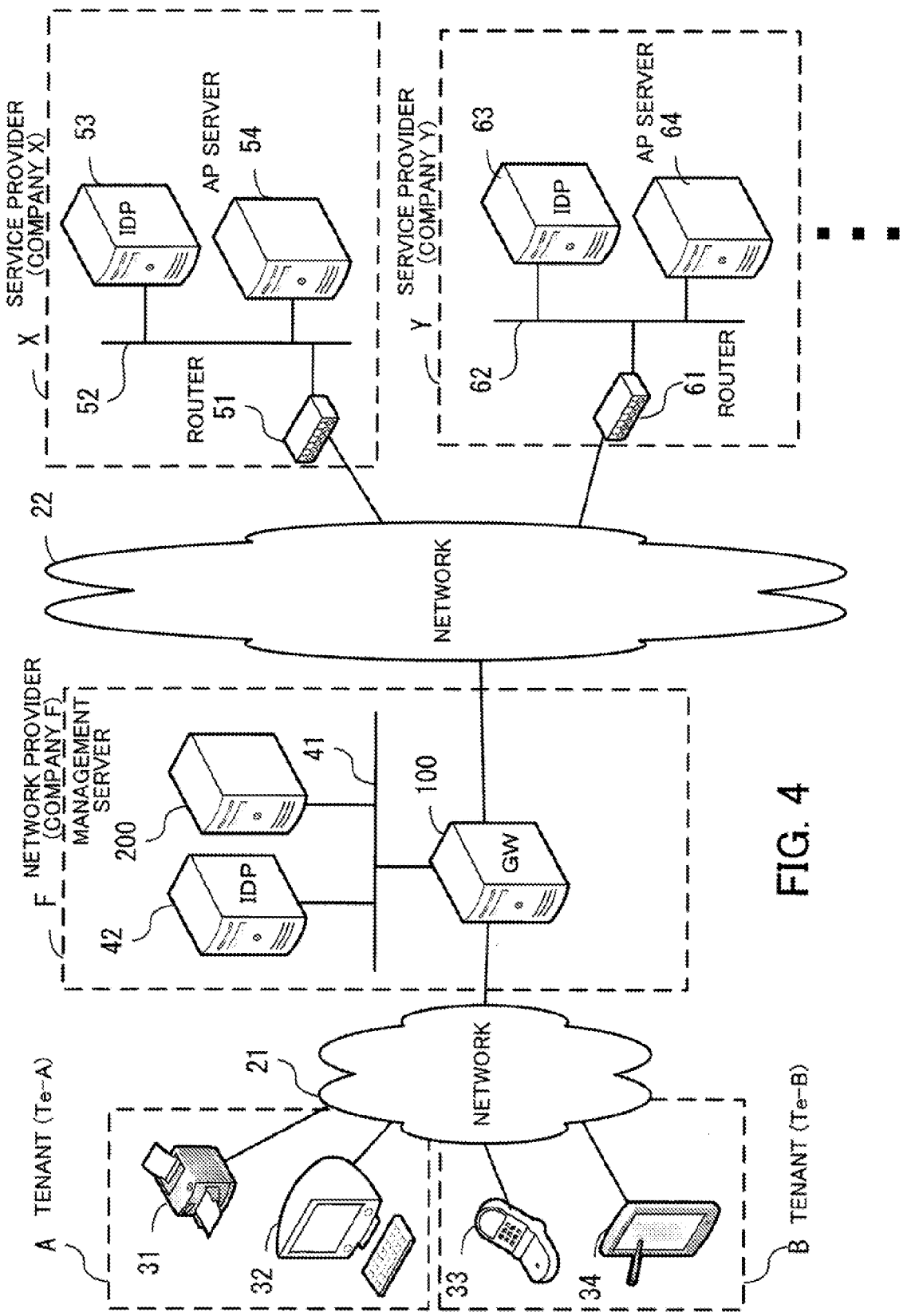
FIG. 4 illustrates an example of configuration of the system according to the second embodiment.

FIG. 4 illustrates an example of the configuration of the system according to the second embodiment. In the example illustrated in FIG. 4, a network service provider F named "Company F" carries out proxy authentication on behalf of users who use terminal devices 31 to 34 connected to a network 21, using the gateway apparatus, denoted by reference numeral 100. The terminal devices 31 to 34 include a printer, a mobile terminal device, and a tablet terminal device.

The terminal devices 31 to 34 are used by users who belong to an organization, such as a company. By concluding a service provision contract with service providers X and Y on an organization basis, services provided by the systems of the service providers X and Y become available to the users belonging to the organization. Hereinafter, an organization which has concluded the service provision contract with the service providers X and Y is referred to as a tenant. In the example illustrated in FIG. 4, the terminal devices 31 and 32 are used by users belonging to a tenant A having a tenant ID of "Te-A". The terminal devices 33 and 34 are used by users belonging to a tenant B having a tenant ID of "Te-B".

In the network provider F, the gateway apparatus 100 is provided between the network 21 and a network 22. The two networks 21 and 22 can use e.g. a VPN (Virtual Private Network).

An identity provider (IDP) 42 and a management server 200 are connected to the gateway apparatus 100 via an internal network 41 within the network provider F. The identity provider 42 performs authentication of users who use the terminal devices 31 to 34. The management server 200 manages authentication information used for proxy authentication necessary in receiving services provided from service providers connected via the network 22. The authentication information is e.g. a combination of a user ID and a password.

In the example illustrated in FIG. 4, the systems of the plurality of service providers X and Y are connected to the network 22. For example, the system of the service provider X named "Company X" and the system of the service provider Y named "Company Y" are connected to the gateway apparatus 100 via the network 22.

In the service provider X, an internal network 52 and the network 22 are connected via a router 51. An identity provider (IDP) 53 and an application (AP) server 54 are connected to the internal network 52. The identity provider 53 performs authentication of a user who uses a service provided by the application server 54. The application server 54 provides the service to a user authenticated by the identity provider 53. For example, the application server 54 executes requested processing in response to a request from the terminal device used by the user authenticated by the identity provider 53.

In the service provider Y, an internal network 62 and the network 22 are connected via a router 61. An identity provider (IDP) 63 and an application server 64 are connected to the internal network 62. The identity provider 63 performs authentication of a user who uses a service provided by the application server 64. The application server 64 provides the service to a user authenticated by the identity provider 63. For example, the application server 64 executes requested processing in response to a request from the terminal device used by the user authenticated by the identity provider 63.

Note that the gateway apparatus 100 illustrated in FIG. 4 is an example of the proxy server 1 according to the first embodiment illustrated in FIG. 1. The management server 200 illustrated in FIG. 4 is an example of the management server 2 according to the first embodiment illustrated in FIG. 1. The internal systems of the service providers X and Y illustrated in FIG. 4 are an example of the processing systems 3 and 4 illustrated in FIG. 1. The terminal devices 31 to 34 are examples of the terminal device 5 according to the first embodiment illustrated in FIG. 1.

Here, the identity provider 53 of the service provider X and the identity provider 63 of the service provider Y are capable of performing processing for delegating access rights. For example, the identity provider 63 delegates the access rights of the users who use the terminal devices 31 to 34 for accessing the application server 64 to the application server 54. This enables the application server 54 to access the application server 64 to thereby make use of the service provided by the application server 64. Examples of protocols which make it possible to delegate access rights as mentioned above include OAuth.

Figure 5:
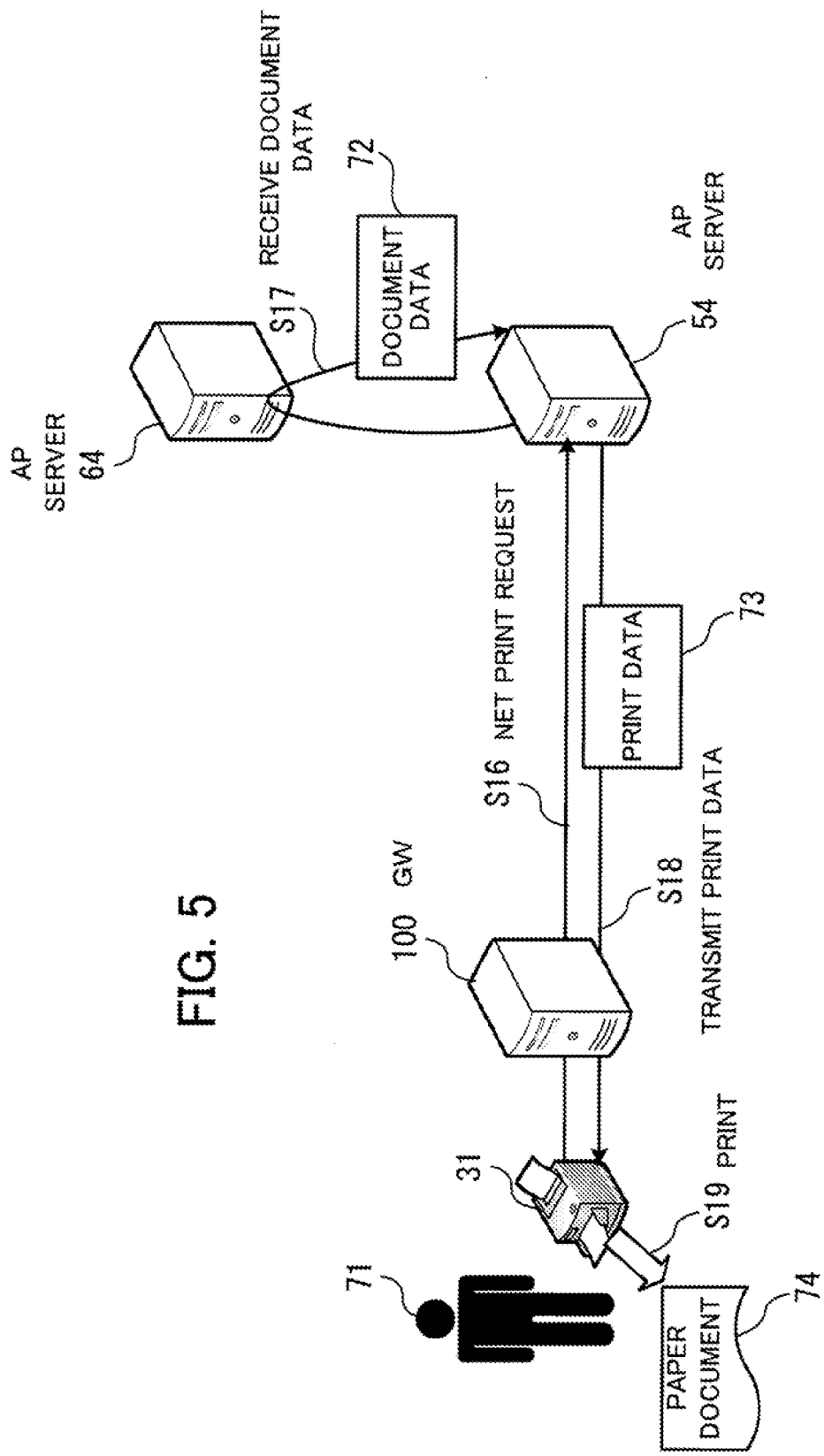
FIG. 5 illustrates an example of a service which is made executable by delegation of access rights.

FIG. 5 illustrates an example of a service which is executable by the delegation of access rights. It is assumed that a user 71 stores his/her document in the application server 64. Further, it is assumed that the application server 54 performs a service for converting document data 72 of the user 71 to print data 73.

When the user 71 intends to print the content of his/her document data 72 stored in the application server 64, for example, the user 71 inputs an instruction for printing the document data 72 using a console panel of the terminal device 31 having a printing function. The terminal device 31 transmits a network print request of the document data 72 to the application server 54 according to the input (step S16). The network print request is delivered to the application server 54 via the gateway apparatus 100. The application server 54 accesses the application server 64 using the access rights given to the user 71 and acquires the document data 72 (step S17). The application server 54 converts the document data 72 to the print data 73, and then transmits the print data 73 to the terminal device 31 (step S18). The terminal device 31 performs printing based on the received print data 73, and discharges a paper document 74 on which the content of the document data 72 has been printed (step S19).

To make use of the above-mentioned service, the rights of access (access rights) to the application server 64 are delegated to the application server 54. In this case, the gateway apparatus 100 that performs proxy authentication on behalf of the user 71 performs not only proxy authentication for using the service provided by the application server 54 but also proxy authentication for using the service provided by the application server 64. For this reason, the gateway apparatus 100 acquires a plurality of authentication information items for using respective services provided by the application server 54 and the application server 64 from the management server 200.

In the second embodiment, to make use of a service which is provided by a plurality of servers in collaboration and is made available when authenticated by each of the servers, the gateway apparatus 100 collectively acquires a plurality of authentication information items used for proxy authentication from the management server 200. This makes it possible to reduce the frequency of communication between the gateway apparatus 100 and the management server 200 to thereby improve the processing efficiency.

Figure 6:
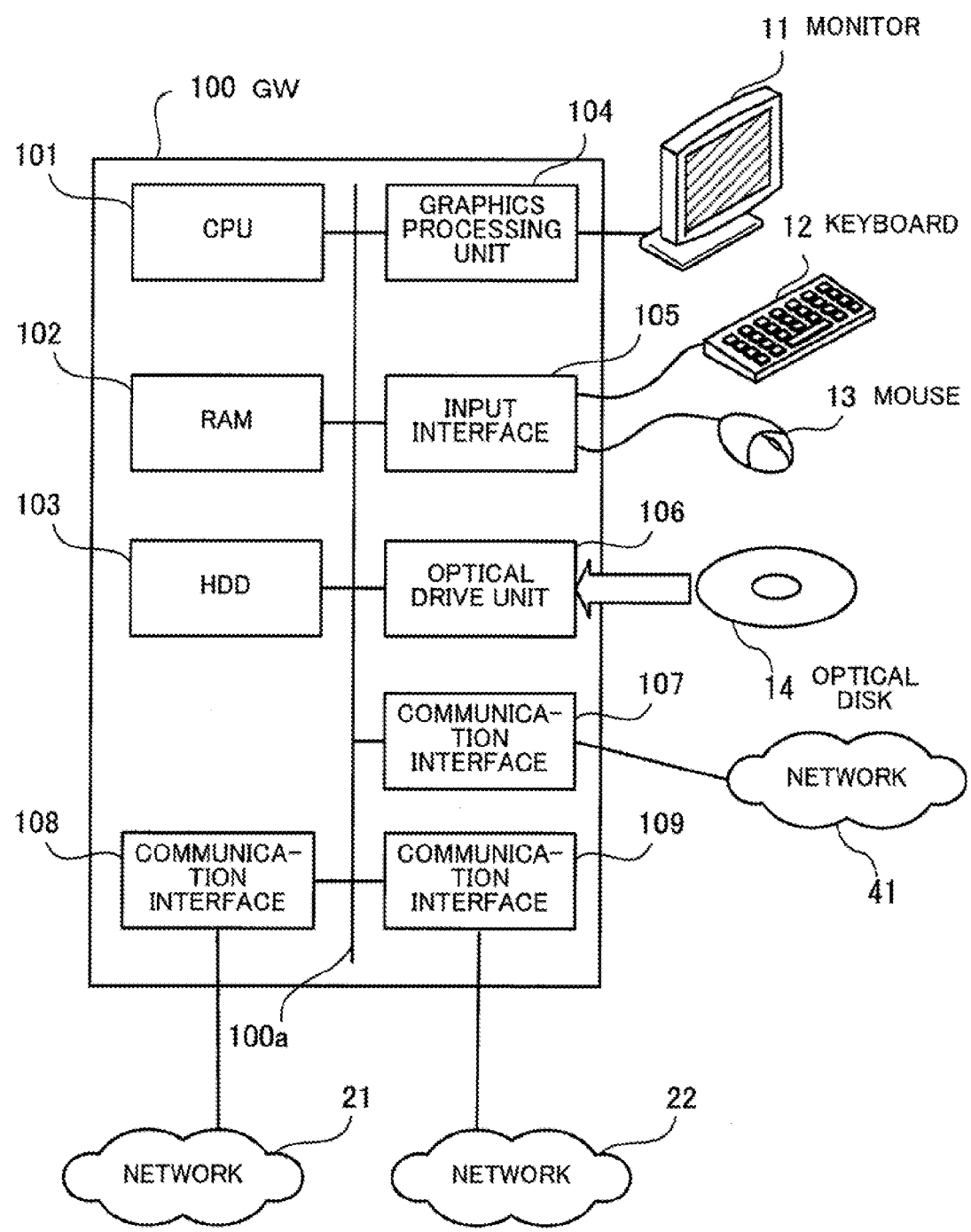
FIG. 6 illustrates an example of the hardware configuration of a gateway apparatus used in the second embodiment.

FIG. 6 illustrates an example of the hardware configuration of the gateway apparatus used in the present embodiment. The entire gateway apparatus 100 is controlled by a CPU 101. A RAM 102 and a plurality of peripheral devices are connected to the CPU 101 via a bus 100a.

The RAM 102 is used as a main storage device of the gateway apparatus 100. The RAM 102 temporarily stores at least part of a program of an OS (operating system) and application programs which the CPU 101 is caused to execute. Further, the RAM 102 stores various data which are necessary for processing by the CPU 101.

The peripheral devices connected to the bus 100a include a HDD 103, a graphics processing unit 104, an input interface 105, an optical drive unit 106, and a plurality of communication interfaces 107 to 109.

The HDD 103 magnetically writes and reads data into and from a disk incorporated therein. The HDD 103 is used as a secondary storage device of the gateway apparatus 100. The HDD 103 stores the program of the OS, the application programs, and various data. Note that a semiconductor storage device, such as a flash memory, may be also used as the secondary storage device.

A monitor 11 is connected to the graphics processing unit 104. The graphics processing unit 104 displays images on a screen of the monitor 11 according to commands from the CPU 101. The monitor 11 may be a display device using a CRT (cathode ray tube) or a liquid crystal display device, for example.

A keyboard 12 and a mouse 13 are connected to the input interface 105. The input interface 105 transmits signals delivered from the keyboard 12 or the mouse 13 to the CPU 101. The mouse 13 is an example of a pointing device, and any other suitable type of pointing device may be used. The other suitable types of the pointing device include a touch panel, a tablet, a touch pad, a track ball, and so forth.

The optical drive unit 106 reads data recorded in an optical disk 14 using e.g. laser light. The optical disk 14 is a portable recording medium in which data is recorded such that the data can be read by reflection of light. Examples of the optical disk 14 include a DVD (Digital Versatile Disc), a DVD-RAM, a CD-ROM (Compact Disc Read Only Memory), a CD-R (Recordable)/RW (ReWritable).

The communication interface 107 is connected to the internal network 41 of the network provider F, and exchanges data with the identity provider 42 and the management server 200 via the internal network 41.

The communication interface 108 is connected to the network 21, and exchanges data with the terminal devices 31 to 34 via the network 21.

The communication interface 109 is connected to the network 22, and exchanges data with various apparatuses including the identity provider 53 and the application server 54 of the service provider X, and the identity provider 63 and the application server 64 of the service provider Y via the network 22.

With the hardware configuration described above, it is possible to realize processing functions of the present embodiment. Although FIG. 6 illustrates the hardware configuration of the gateway apparatus 100, the identity provider 42 and the management server 200 of the network provider F are also realized by the same hardware configuration. Further, the identity provider 53 and the application server 54 of the service provider X are also realized by the same hardware configuration as that of the gateway apparatus 100. Further, the identity provider 63 and the application server 64 of the service provider Y are also realized by the same hardware configuration as that of the gateway apparatus 100. Furthermore, the terminal devices 31 to 34 are also realized by the same hardware configuration as that of the gateway apparatus 100. However, the terminal devices 31 to 34 each have, in addition to the same hardware configuration as that of the gateway apparatus 100, a printing function, a telephone function, a touch sensor, and so forth, depending on its usage.

It is also possible to realize the proxy server 1 and the management server 2 illustrated in the first embodiment by the same hardware configuration as that of the gateway apparatus 100 illustrated in FIG. 6.

Next, a description will be given of processing functions of the respective apparatuses.

Figure 7:
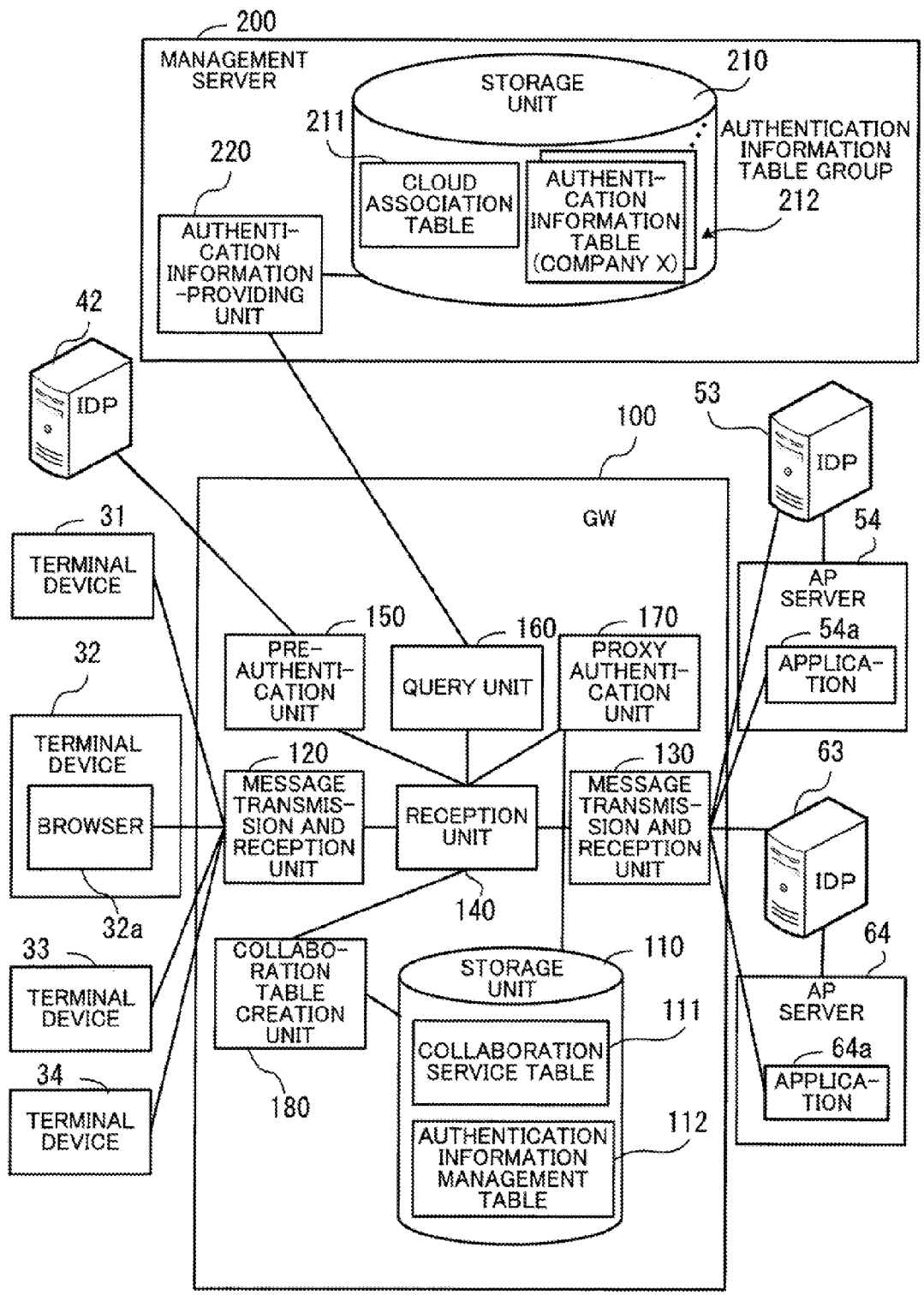
FIG. 7 is a block diagram of an example of processing functions of respective apparatuses.

FIG. 7 is a block diagram of an example of the processing functions of the respective apparatuses. In the example illustrated in FIG. 7, it is assumed that a user of the terminal device 32 receives a service provided by an application 54a implemented in the application server 54, using a browser 32a of the terminal device 32. Further, the user of the terminal device 32 has stored his/her document data in the application server 64, and the stored document data is extracted by an application 64a implemented in the application server 64. Processing executed by the application 54a includes processing using the document data stored in the application server 64.

The management server 200 includes a storage unit 210 and an authentication information-providing unit 220. The storage unit 210 is realized e.g. by a RAM or a HDD in the management server 200. The storage unit 210 stores a cloud association table 211 and an authentication information table group 212. The cloud association table 211 is a data table in which URLs of the identity providers 53 and 63 of the service providers are registered. The authentication information table group 212 is a group of authentication information tables formed for respective service providers, in each of which is registered authentication information on each of users belonging to each of organizations (tenants) which receive the service.

The authentication information-providing unit 220 acquires authentication information from the storage unit 210 in response to a query about authentication information from the gateway apparatus 100, and responds to the gateway apparatus 100. For example, the authentication information-providing unit 220 receives a query containing a set of a tenant name, a user ID, and a URL of at least one IDP, and acquires authentication information corresponding to the information indicated in the query from the storage unit 210. Then, the authentication information-providing unit 220 transmits the acquired authentication information to the gateway apparatus 100.

The gateway apparatus 100 includes a storage unit 110, a message transmission and reception unit 120, a message transmission and reception unit 130, an accepting unit 140, a pre-authentication unit 150, a query unit 160, a proxy authentication unit 170, and a collaboration table creation unit 180.

The storage unit 110 stores a collaboration service table 111 and an authentication information management table 112. For example, part of the RAM 102 or the HDD 103 is used as the storage unit 110. The collaboration service table 111 is a data table in which are registered, on a service-by-service basis, respective URLs of identity providers by which authentication is to be performed. The authentication information management table 112 is a data table in which is registered, on a user-by-user basis, authentication information items of respective users for being authenticated by an IDP associated with each service.

The message transmission and reception unit 120 receives messages sent from the terminal devices 31 to 34. The message transmission and reception unit 120 transfers the received messages to the accepting unit 140. Further, upon receipt of messages addressed to the terminal devices 31 to 34 from the accepting unit 140, the message transmission and reception unit 120 transmits the received messages to the addressed terminal devices, respectively.

The message transmission and reception unit 130 receives messages sent from the identity providers 53 and 63 and the application servers 54 and 64. The message transmission and reception unit 130 transfers the received messages to the accepting unit 140. When messages addressed to the identity providers 53 and 63 and the application servers 54 and 64 are received from the accepting unit 140, the message transmission and reception unit 130 transmits the received messages to the addressed apparatuses, respectively.

The accepting unit 140 accepts messages output e.g. from the terminal devices 31 to 34, the identity providers 53 and 63, and the application servers 54 and 64, and analyzes a type of each message. Then, the accepting unit 140 requests another element to execute processing according to the type of each message. Further, upon receipt of the processing result responsive to the message from the element, the accepting unit 140 transmits a message of the processing result to one of the message transmission and reception units 120 and 130.

The pre-authentication unit 150 controls processing of pre-authentication of the terminal devices 31 to 34. For example, upon receipt of a service request message indicative of a processing request delivered from one of the terminal devices 31 to 34, which has not been authenticated in the pre-authentication, from the accepting unit 140, the pre-authentication unit 150 returns a message saying that the authentication processing is to be shifted to the user authentication processing by the identity provider 42, to the corresponding terminal device. Note that when the user is properly authenticated by the identity provider 42, the pre-authentication unit 150 acquires information indicating that the user has been authenticated, from the identity provider 42. The information indicating that the user has been authenticated is caused to be included e.g. in a service request message received again from the terminal device requesting the service. At this time, for example, the information indicating that the user has been authenticated is encoded and is caused to be included in the service request message. In this case, the pre-authentication unit 150 recognizes that the user has been authenticated by decoding the information indicating that the user has been authenticated using e.g. a key which was acquired from the identity provider 42 in advance. For the user authentication by the identity provider 42, it is possible to make use of an OpenID authentication system, for example.

Upon acquisition of a service request message to an unauthenticated service, the query unit 160 queries the management server 200 about the authentication information. Then, the query unit 160 passes the authentication information acquired from the management server 200 to the accepting unit 140. This authentication information is passed to the proxy authentication unit 170 via the accepting unit 140.

The proxy authentication unit 170 accesses the identity provider that performs authentication for the application server as a destination of the service request message to have the user authenticated using the authentication information received via the accepting unit 140.

The collaboration table creation unit 180 creates the collaboration service table 111. For example, when a cooperative relationship between servers, which has not been registered in the collaboration service table 111, is detected, the collaboration table creation unit 180 additionally registers an entry indicative of the cooperative relationship in the collaboration service table 111.

Note that lines connecting between the respective elements illustrated in FIG. 7 indicate some of the communication paths, and it is possible to set communication paths other than the illustrated communication paths.

Further, the first storage unit 1a according to the embodiment illustrated in FIG. 1 is realized by the storage unit 110 according to the second embodiment. The transmission unit 1b and the reception unit 1c according to the embodiment illustrated in FIG. 1 are realized by the query unit 160 according to the second embodiment. The transmission unit 1d according to the embodiment illustrated in FIG. 1 is realized by the proxy authentication unit 170 according to the second embodiment. The second storage unit 2a according to the embodiment illustrated in FIG. 1 is realized by the storage unit 210 according to the second embodiment. The reception unit 2b and the transmission unit 2c according to the embodiment illustrated in FIG. 1 are realized by the authentication information-providing unit 220 according to the second embodiment.

Next, a detailed description will be given of the contents of the data tables stored in each apparatus. First, the cloud association table 211 stored in the storage unit 210 of the management server 200 and the authentication information tables in the authentication information table group 212 will be described.

FIG. 8 illustrates an example of a data structure of the cloud association table. The cloud association table 211 includes columns of IDP_URL and the service provider.

The URL of an identity provider belonging to a service provider is set in each box of the column of IDP_URL. The name of the service provider is set in each box of the column of the service provider. In the example illustrated in FIG. 8, the URL of the identity provider 42 belonging to the network provider F is "http://IDP0.com". The URL of the identity provider 53 belonging to the service provider X is "https://IDP1.com". The URL of the identity provider 63 belonging to the service provider Y is "https://IDP2.com".

FIG. 9 illustrates an example of a data structure of the authentication information table. Authentication information tables 212a, 212b, . . . , associated with respective service providers are stored in the authentication information table group 212. For example, the authentication information table 212a is associated with the service provider X having the name of "Company X", and the authentication information table 212b is associated with the service provider Y having the name of "Company Y".

The authentication information table 212a includes columns of tenant ID, user ID, Company X ID, and Company X password. Identification information (tenant ID) of an organization (tenant) that receives a service provided by the service provider X is set in each box of the column of tenant ID. Identification information (user ID) of a user in an organization indicated by the tenant ID is set in each box of the column of user ID. A user ID of a tenant which is registered in the identity provider 53 of the service provider X is set in each box of the column of Company X ID. A password for authenticating a tenant by the identity provider 53 of the service provider X is set in each box of the column of Company X password.

The authentication information table 212b includes columns of tenant ID, user ID, Company Y ID, and Company Y password. Identification information (tenant ID) of an organization (tenant) that receives a service provided by the service provider Y is set in each box of the column of tenant ID. Identification information (user ID) of a user in an organization indicated by the tenant ID is set in each box of the column of user ID. A user ID of a tenant which is registered in the identity provider 63 of the service provider Y is set in each box of the column of Company Y ID. A password for authenticating a tenant by the identity provider 63 of the service provider Y is set in each box of the column of Company Y password.

Next, a description will be given of the collaboration service table 111 and the authentication information management table 112, stored in the storage unit 110 of the gateway apparatus 100.

FIG. 10 illustrates an example of a data structure of the collaboration service table. The collaboration service table 111 includes columns of tenant ID, service URL, IDP_URL, and linked collaborator IDP_URL.

A tenant ID of an organization of a user who uses a terminal device which has sent a service request message is set in each box of the column of tenant ID. A URL of an application server as a destination of a service request message is set in each box of the column of service URL. A URL of an identity provider which performs user authentication on a user who receives a service provided by an application server as a destination of a service request message is set in each box of the column of IDP_URL. A URL of another application server that performs processing in collaboration with the application server as the destination of the service request message is set in each box of the column of linked collaborator IDP_URL.

FIG. 11 illustrates an example of a data structure of the authentication information management table. The authentication information management table 112 includes columns of tenant ID, user ID, IDP_URL, ID, and password (PW).

A tenant ID of an organization of a user who uses a terminal device which has sent a service request message is set in each box of the column of tenant ID. A user ID of a user who uses a terminal device which has sent a service request message is set in each box of the column of user ID. A URL of an identity provider which performs user authentication is set in each box of the column of IDP_URL. A user ID used for authentication is set in each box of the column of ID. A password used for authentication is set in each box of the column of password (PW).

A collaboration service involving proxy authentication is provided using the above-described information. A detailed description will be given, hereinafter, of a process for providing a collaboration service involving proxy authentication. In the following example, it is assumed that the user gives the rights of access to the application server storing his/her data, to another application server, using OAuth.

<Operation Phase>

First, a description will be given of a process for providing a collaboration service (operation phase) by the application server 54 of Company X and the application server 64 of Company Y in a case where information in which the application server 54 is set as a linking collaborator and the application server 64 is set as a linked collaborator has been registered in the collaboration service table 111. In this case, the identity provider 63 of Company Y functions as a token server in OAuth.

Figure 12:
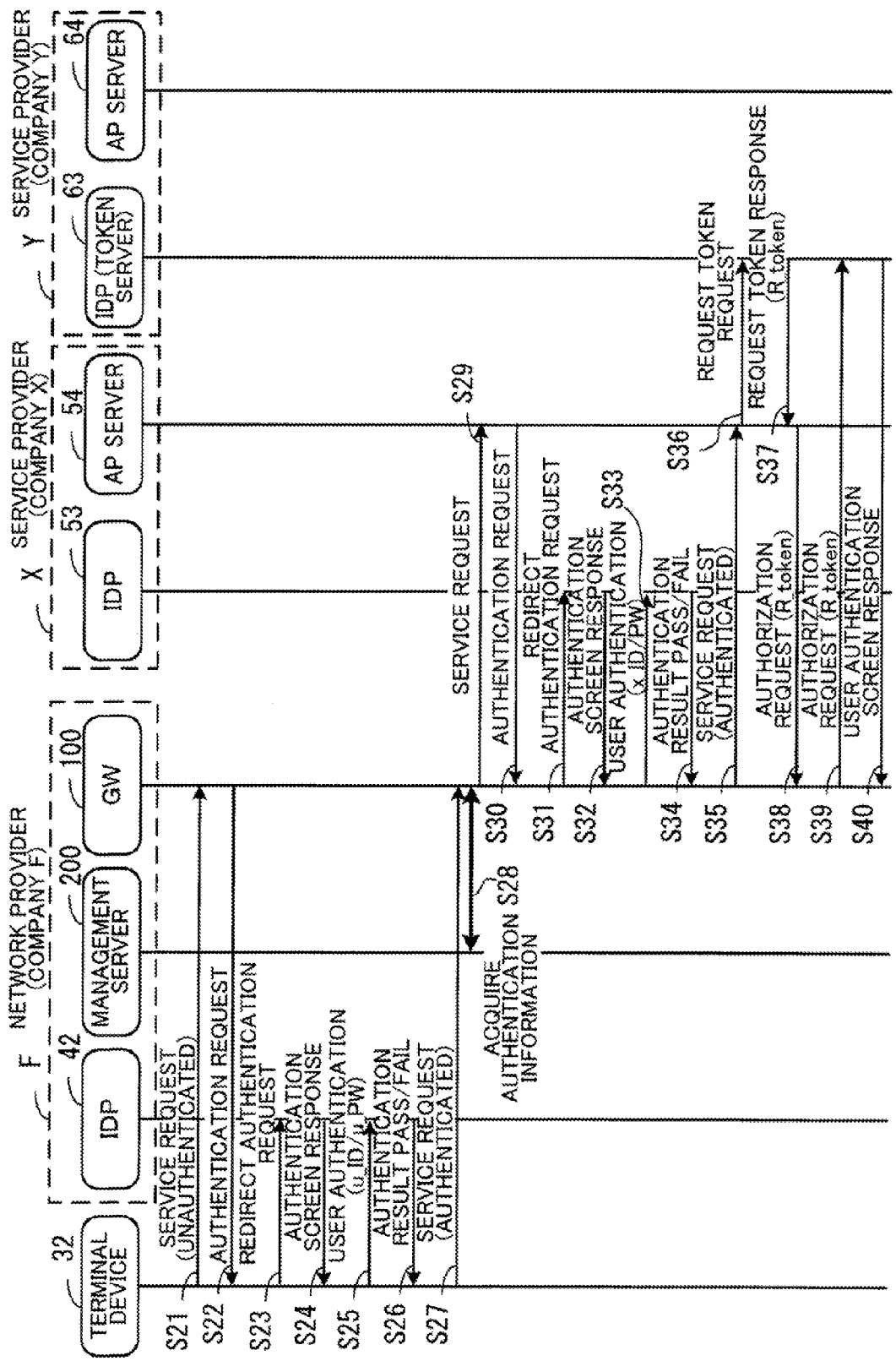
FIG. 12 is a sequence diagram of the first half of an example of a process for providing a registered collaboration service.

FIG. 12 is a sequence diagram of the first half of an example of a process for providing a registered collaboration service. The process illustrated in FIG. 12 will be described hereinafter in order of step number.

[step S21] The terminal device 32 transmits a service request message addressed to the application server 54 in an unauthenticated state of pre-authentication. For example, the service request message is transmitted based on an input to the browser 32a by the user of the terminal device 32. The transmitted service request message is received by the gateway apparatus 100.

[step S22] The gateway apparatus 100 sends an authentication request to the terminal device 32 as a response. For example, in the gateway apparatus 100, the message transmission and reception unit 120 receives the service request message, and transfers the received service request message to the accepting unit 140. The accepting unit 140 analyzes the message and thereby recognizes that the transferred message is the service request message, and transfers the service request message to the pre-authentication unit 150. The pre-authentication unit 150 recognizes that the user who uses the terminal device 32 has not been authenticated in pre-authentication, and generates an authentication request message. The authentication request message contains an instruction for redirecting the authentication request message to the identity provider 42. Then, the pre-authentication unit 150 passes the authentication request message addressed to the terminal device 32 to the accepting unit 140. The accepting unit 140 transmits the authentication request message to the terminal device 32 via the message transmission and reception unit 120.

[step S23] Upon receipt of the authentication request message, the terminal device 32 transfers the authentication request message to the identity provider 42 according to the redirection message.

[step S24] The identity provider 42 sends an authentication screen to the terminal device 32 as a response.

[step S25] The terminal device 32 displays the authentication screen, and receives an input of authentication information from the user to the authentication screen. The authentication information is e.g. a combination of a user ID (u_ID) and a password (u_PW). Then, the terminal device 32 transmits a user authentication message containing the authentication information to the identity provider 42.

[step S26] The identity provider 42 performs user authentication based on the authentication information contained in the user authentication message received from the terminal device 32. For example, in the identity provider 42, authentication information (combination of a user ID and a password) of each of users who are allowed to use the proxy authentication function by the gateway apparatus 100 is registered in advance. Then, if the authentication information contained in the user authentication message matches one of the authentication information items registered in advance, the identity provider 42 authenticates the user who uses the terminal device 32 as a valid user. The identity provider 42 transmits the result of authentication to the terminal device 32. The result of authentication contains information indicative of success (PASS) or failure (FAIL) in the authentication. When the authentication is successful, the result of authentication contains, for example, the tenant ID and the user ID which have been encoded, together with the information indicative of the successful authentication.

[step S27] If the result of authentication indicative of the successful authentication is received, the terminal device 32 transmits an authenticated service request message addressed to the application server 54. The authenticated service request message contains e.g. the information indicative of the successful authentication. The transmitted service request message is received by the gateway apparatus 100.

[step S28] Upon receipt of the service request message, the gateway apparatus 100 acquires authentication information from the management server 200. For example, in the gateway apparatus 100, the message transmission and reception unit 130 receives authentication screen data, and transfers the same to the accepting unit 140. The accepting unit 140 transfers the authentication screen data to the proxy authentication unit 170. The proxy authentication unit 170 searches the collaboration service table 111 for an entry associated with the combination of the tenant ID and the URL of the application server 54 corresponding to the service request message from the terminal device 32. Then, the proxy authentication unit 170 acquires the URL of the identity provider 53 and the URL of the identity provider 63 as a linked collaborator contained in the corresponding entry.

The proxy authentication unit 170 further searches the authentication information management table 112 for entries in which the tenant ID and the user ID corresponding to the message from the terminal device 32 are included and the identity provider 53 and the identity provider 63 are set as the identity providers of respective service providers. If the corresponding authentication information items have not been registered in the authentication information management table 112, the proxy authentication unit 170 transmits a request for acquiring the authentication information to the query unit 160 via the accepting unit 140. Then, the query unit 160 queries the management server 200 about authentication information items corresponding to identity providers of which the authentication information items are not stored. The tenant ID, the user ID, and the URLs of the respective identity providers are caused to be included in the query.

In the management server 200, the authentication information-providing unit 220 receives the query about the authentication information, and acquires the authentication information corresponding to the query from the storage unit 210. For example, in the management server 200, the authentication information-providing unit 220 refers to the cloud association table 211, and identifies the service providers corresponding to the URLs of the identity providers indicated in the query. Next, the authentication information-providing unit 220 acquires a combination of a user ID and a password corresponding to the combination of the tenant ID and the user ID indicated in the query from each of the respective authentication information tables of the identified service providers. Then, the authentication information-providing unit 220 transmits the authentication information acquired from the authentication information table of each service provider e.g. in association with the URL of the identity provider of the service provider to the gateway apparatus 100.

In the gateway apparatus 100, the query unit 160 acquires the authentication information transmitted from the authentication information-providing unit 220. The query unit 160 transmits the acquired authentication information associated with each URL of the identity provider to the proxy authentication unit 170 via the accepting unit 140.

[step S29] The gateway apparatus 100 transfers the authenticated service request message to the application server 54 as a destination. For example, the message transmission and reception unit 120 of the gateway apparatus 100 receives a service request message, and transfers the same to the accepting unit 140. The accepting unit 140 transfers the received service request message to the pre-authentication unit 150. Then, the pre-authentication unit 150 confirms that the user has been authenticated in the pre-authentication, and returns the service request message to the accepting unit 140. The accepting unit 140 transmits the service request message to the application server 54 via the message transmission and reception unit 130.

Note that when the authenticated service request message is received from the terminal device 32, from then on, the accepting unit 140 manages communication processing responsive to the message from the terminal device 32 in association with the combination of the tenant ID and the user ID indicated in the service request message. The correspondence relationship between the service request message and communication responsive to the service request message can be managed e.g. by holding the association between the sessions used for communication.

[step S30] Upon receipt of the service request message, the application server 54 transmits an authentication request message addressed to the terminal device 32 as a response. The authentication request message contains an instruction for redirecting the authentication request message to the identity provider 53. The transmitted authentication request message is received by the gateway apparatus 100.

[step S31] Upon receipt of the authentication request message, the gateway apparatus 100 transfers the authentication request message to the identity provider 53 according to the redirect instruction. For example, in the gateway apparatus 100, the message transmission and reception unit 130 receives the authentication request message transmitted from the application server 54, and transfers the same to the accepting unit 140. The accepting unit 140 transfers the authentication request message to the identity provider 53 via the message transmission and reception unit 130 according to the redirection instruction of the authentication request message.

[step S32] The identity provider 53 transmits the authentication screen data to the gateway apparatus 100 as a response.

[step S33] The gateway apparatus 100 transmits a user authentication message to the identity provider 53. For example, the proxy authentication unit 170 of the gateway apparatus 100 generates a user authentication message addressed to the identity provider 53, containing the authentication information (x_ID/x_PW) corresponding to the URL of the identity provider 53. Then, the proxy authentication unit 170 delivers the generated user authentication message to the accepting unit 140. The accepting unit 140 transmits the acquired user authentication message to the identity provider 53 via the message transmission and reception unit 130.

[step S34] The identity provider 53 performs user authentication based on the authentication information contained in the received user authentication message. For example, an item of authentication information (combination of a user ID and a password) of each tenant allowed to make use of the service provided by the application server 54 has been registered in the identity provider 53 in advance. Then, if the authentication information contained in the received user authentication message matches one of the authentication information items which have been registered in advance, the identity provider 53 determines that the authentication is successful. Then, the identity provider 53 transmits the result of authentication to the gateway apparatus 100. The authentication result contains information indicative of success (PASS) or failure (FAIL) in the authentication. Further, an authentication result message for transmitting the authentication result contains e.g. an instruction for redirecting the authentication result message to the application server 54.

[step S35] If the authentication result indicative of the successful authentication is received, the gateway apparatus 100 transmits an authenticated service request message to the application server 54. This service request message contains e.g. information indicative of the successful authentication. For example, the message transmission and reception unit 130 of the gateway apparatus 100 receives the authentication result message delivered from the identity provider 53, and transfers the same to the accepting unit 140. The accepting unit 140 transmits the authentication result to the application server 54 via the message transmission and reception unit 130 as the authenticated service request message according to the redirect instruction contained in the received authentication result message.

[step S36] The application server 54 analyzes the content of the service request message, and recognizes that the message requests collaboration processing to be performed in collaboration with the application server 64. The application server 54 judges based on the content of the service request message that the collaboration processing with the application server 64 is to be performed. In this case, the application server 54 transmits a request token request to the identity provider 63 of Company Y.

[step S37] In response to the request token request, the identity provider 63 sends an unauthorized request token to the application server 54 for determination of whether or not to transfer the user's data. That the request token is unauthorized means that the request token does not contain information on access permission.

[step S38] Upon receipt of the unauthorized request token, the application server 54 transmits a permission request message containing the request token to the gateway apparatus 100. In doing this, the permission request message contains an instruction for redirecting the permission request message to the identity provider 63. At this time, the unauthorized request token can be caused to be contained e.g. in a response message using the HTTP (see FIG. 17). Note that the proxy authentication to the identity provider 63 is performed by the gateway apparatus 100 according to the permission request message, and hence the permission request message is a type of the authentication request message.

[step S39] Upon acquisition of the permission request message, the gateway apparatus 100 sends the permission request message to the identity provider 63 according to the redirect instruction. In doing this, the proxy authentication unit 170 of the gateway apparatus 100 holds the unauthorized request token contained in the acquired permission request message.

[step S40] The identity provider 63 transmits the user authentication screen data to the gateway apparatus 100 as a response. Then, the process proceeds to a step S51 (see FIG. 13).

Figure 13:
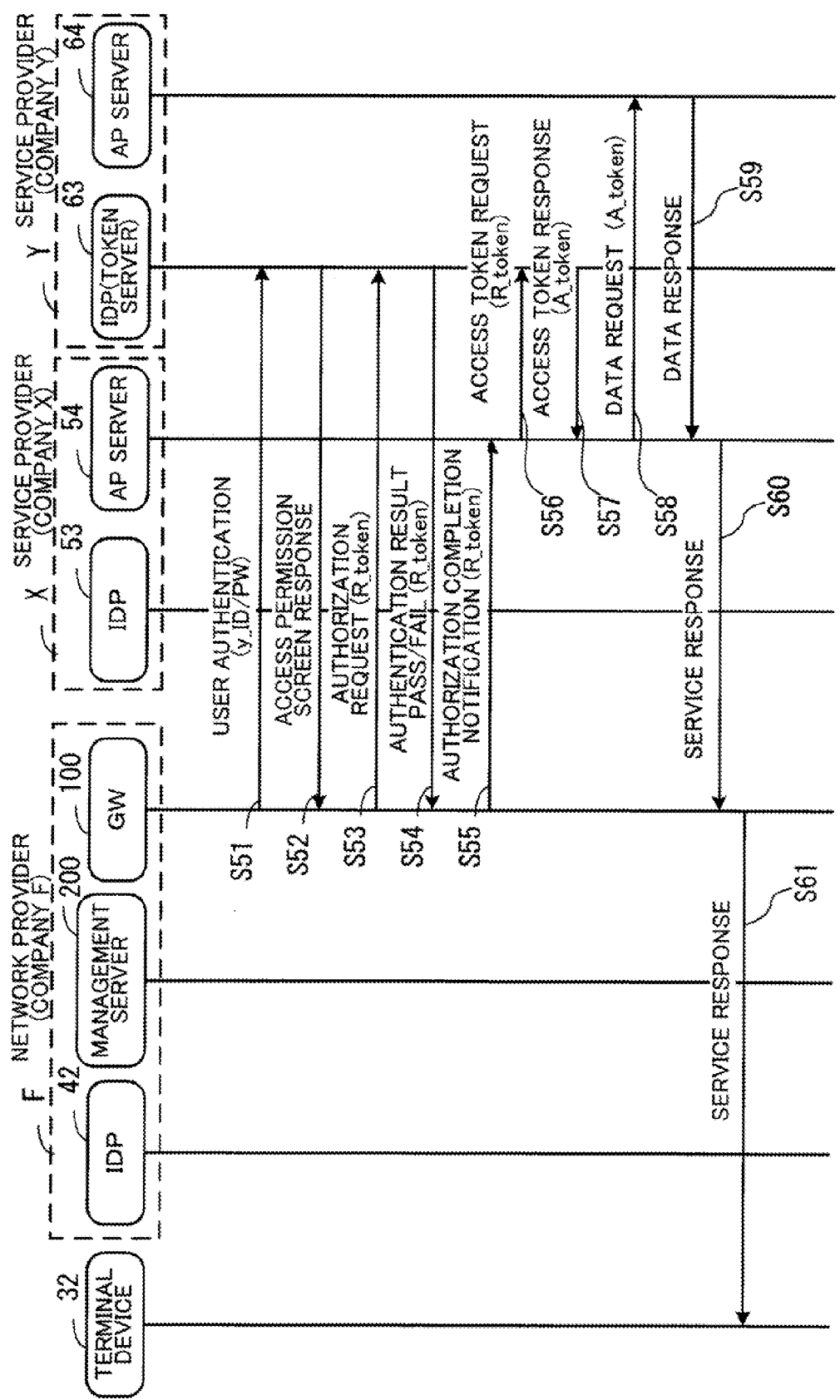
FIG. 13 is a sequence diagram of the second half of the example of the process for providing a registered collaboration service.

FIG. 13 is a sequence diagram of the second half of the example of the process for providing the registered collaboration service. The process illustrated in FIG. 13 will be described hereinafter in order of step number.

[step S51] The gateway apparatus 100 transmits a user authentication message to the identity provider 63. For example, the proxy authentication unit 170 of the gateway apparatus 100 generates a user authentication message addressed to the identity provider 63, which contains the authentication information (y_ID/y_PW) corresponding to the URL of the identity provider 63. Then, the proxy authentication unit 170 passes the generated user authentication message to the accepting unit 140. The accepting unit 140 transmits the acquired user authentication message to the identity provider 63 via the message transmission and reception unit 130.

Note that the authentication information contained in the user authentication message has been acquired in the step S28 (see FIG. 12).

[step S52] The identity provider 63 transmits access permission screen data to the gateway apparatus 100 as a response. The access permission screen data is e.g. data of a screen which displays the content and condition of document data to be accessed by the application server to thereby prompt the gateway apparatus 100 to determine whether or not the access permission may be granted (access permission determination request).

[step S53] The gateway apparatus 100 transmits an access permission request message containing the unauthorized request token to the identity provider 63. Note that the access permission request message is a message for querying about whether or not access to the content indicated in the access permission screen data (provision of the document data to the application server 54) may be permitted. For example, the proxy authentication unit 170 of the gateway apparatus 100 generates an access permission request message addressed to the identity provider 63, which contains the unauthorized request token held in the step S39. Then, the proxy authentication unit 170 passes the generated access permission request message to the accepting unit 140. The accepting unit 140 transmits the permission request message to the identity provider 63 via the message transmission and reception unit 130.

[step S54] The identity provider 63 transmits the result of authentication to the gateway apparatus 100. The result of authentication contains information indicating whether the authentication is successful (PASS) or unsuccessful (FAIL). If the authentication is successful, the result of authentication is caused to contain a request token indicative of access permission. Note that a request token indicative of access permission is caused to be contained e.g. in an HTTP response message (see FIG. 18). Further, the authentication result message indicative of the result of authentication contains e.g. an instruction for redirecting the authentication result message to the application server 54.

[step S55] Upon receipt of the authentication result message indicative of the success in authentication, the gateway apparatus 100 transmits a permission completion notification containing the request token indicative of access permission, to the application server 54. For example, the message transmission and reception unit 130 of the gateway apparatus 100 receives the result of authentication, and transfers the same to the accepting unit 140. The accepting unit 140 sends the received authentication result message to the application server 54 via the message transmission and reception unit 130 as the permission completion notification message addressed to the application server 54, according to the redirect instruction indicated in the authentication result message.

[step S56] Upon receipt of the permission completion notification message, the application server 54 transmits an access token request to the identity provider 63. The access token request contains the request token indicative of access permission.

[step S57] Upon receipt of the access token request, the identity provider 63 confirms that the access token request contains the request token indicative of access permission, and then transmits an access token response to the application server 54. The access token response contains an access token indicative of an API (Application Program Interface) for data acquisition.

[step S58] Upon receipt of the access token response, the application server 54 transmits a data request using the API for data acquisition contained in the access token response to the application server 64.

[step S59] The application server 64 transmits data in response to the data request.

[step S60] The application server 54 executes predetermined processing using the data transmitted from the application server 64 as a response. For example, the application server 54 converts the document data acquired from the application server 64 into print data. Then, the application server 54 transmits a service response indicative of the processing result to the gateway apparatus 100.

[step S61] The gateway apparatus 100 transfers the received service response to the terminal device 32.

As described above, the gateway apparatus 100 can carry out the procedure of proxy authentication for using the functions of the plurality of application servers 54 and 64 which carry out the collaboration service. What is more, the gateway apparatus 100 can collectively acquire a plurality of authentication information items for use in proxy authentication from the management server 200.

Figure 14:
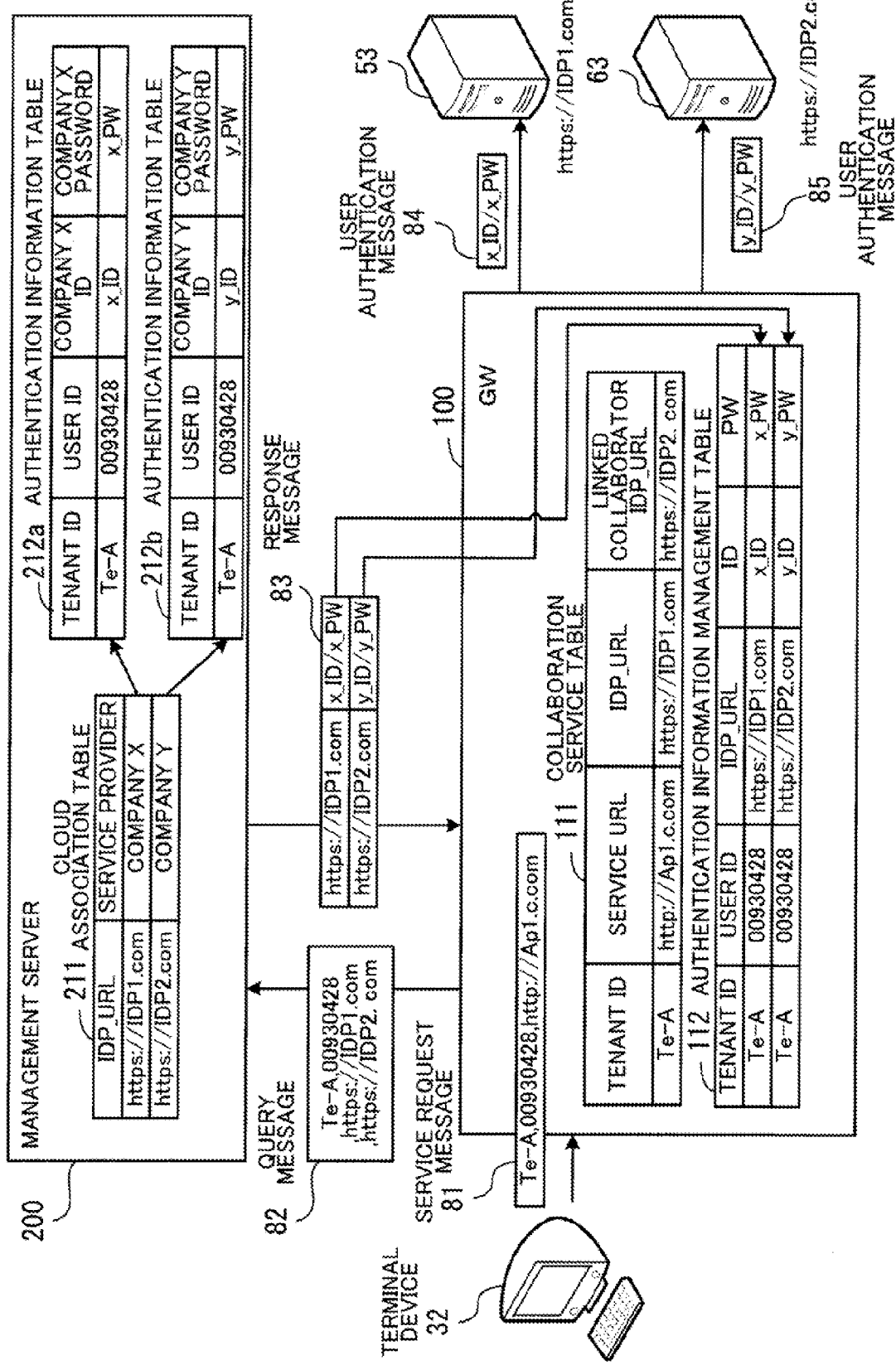
FIG. 14 illustrates an example of proxy authentication for a collaboration service.

FIG. 14 illustrates an example of proxy authentication for a collaboration service. An authenticated service request message 81 is input e.g. from the terminal device 32 to the gateway apparatus 100. The service request message 81 contains the tenant ID "Te-A", the user ID "00930428" and the URL of the application server 54 "http://Ap1.c.com". In the gateway apparatus 100, the URL "https://IDP1.com" of the identity provider 53 as the linking collaborator and URL "https://IDP2.com" of the identity provider 63 as the linked collaborator, which correspond to the combination of the tenant ID "Te-A" and the URL "http://Ap1.c.com" of the application server 54, are acquired from the collaboration service table 111.

Then, a query message 82 is transmitted from the gateway apparatus 100 to the management server 200. The query message 82 contains the tenant ID "Te-A", the user ID "00930428", the URL "https://IDP1.com" of the identity provider 53 as the linking collaborator, and the URL "https://IDP2.com" of the identity provider 63 as the linked collaborator.

The management server 200 determines based on the cloud association table 211 that the service provider corresponding to the URL "https://IDP1.com" of the identity provider 53 as the linking collaborator in the query message 82 is "Company X". Then, the management server 200 acquires authentication information corresponding to the combination of the tenant ID "Te-A" and the user ID "00930428" from the authentication information table 212a set in association with Company X. The authentication information is the combination of the user ID "x_ID" and the password "x_PW".

Similarly, the management server 200 determines based on the cloud association table 211 that the service provider corresponding to the URL "https://IDP2.com" of the identity provider 63 as the linked collaborator in the query message 82 is "Company Y". Then, the management server 200 acquires authentication information corresponding to the combination of the tenant ID "Te-A" and the user ID "00930428" from the authentication information table 212b set in association with Company Y. The authentication information is the combination of the user ID "y_ID" and the password "y_PW".

Then, the management server 200 collectively transmits the combination of the URL of the identity provider 53 as the linking collaborator and the authentication information, and the combination of the URL of the identity provider 63 as the linked collaborator and the authentication information, to the gateway apparatus 100 as a single response message 83.

The gateway apparatus 100 registers a plurality of authentication information items contained in the response message 83 transmitted from the management server 200 in the authentication information management table 112 in association with the tenant ID "Te-A", the user ID "00930428", and the URL "https://IDP1.com" of the identity provider 53 as the linking collaborator. Then, the gateway apparatus 100 transmits a user authentication message 84 containing the authentication information (x_ID/x_PW) associated with the URL "https://IDP1.com" of the identity provider 53 as the linking collaborator, to the identity provider 53, for authentication by the identity provider 53. Further, the gateway apparatus 100 transmits a user authentication message 85 containing the authentication information (y_ID/y_PW) associated with the URL "https://IDP2.com" of the identity provider 63 as the linked collaborator, to the identity provider 63, for authentication by the identity provider 63.

As described above, it is possible to collectively acquire respective authentication information items on a plurality of servers that perform a collaboration service, from the management server 200. As a consequence, it is possible to reduce the frequency of communication between the gateway apparatus 100 and the management server 200, and thereby improve the processing efficiency.

<Learning Phase>

Next, a description will be given of a case where information in which the application server 54 is set as a linking collaborator, and the application server 64 is set as a linked collaborator is not registered in the collaboration service table 111 (learning phase). In such a case, when a service request message for a collaboration service provided by the application server 54 of Company X and the application server 64 of Company Y is first input to the gateway apparatus 100, the gateway apparatus 100 acquires respective authentication information items on the plurality of application servers 54 and 64 individually from the management server 200. At this time, the gateway apparatus 100 learns the relationship in the collaboration service, and registers the information on the relationship in the collaboration service table 111.

Figure 15:
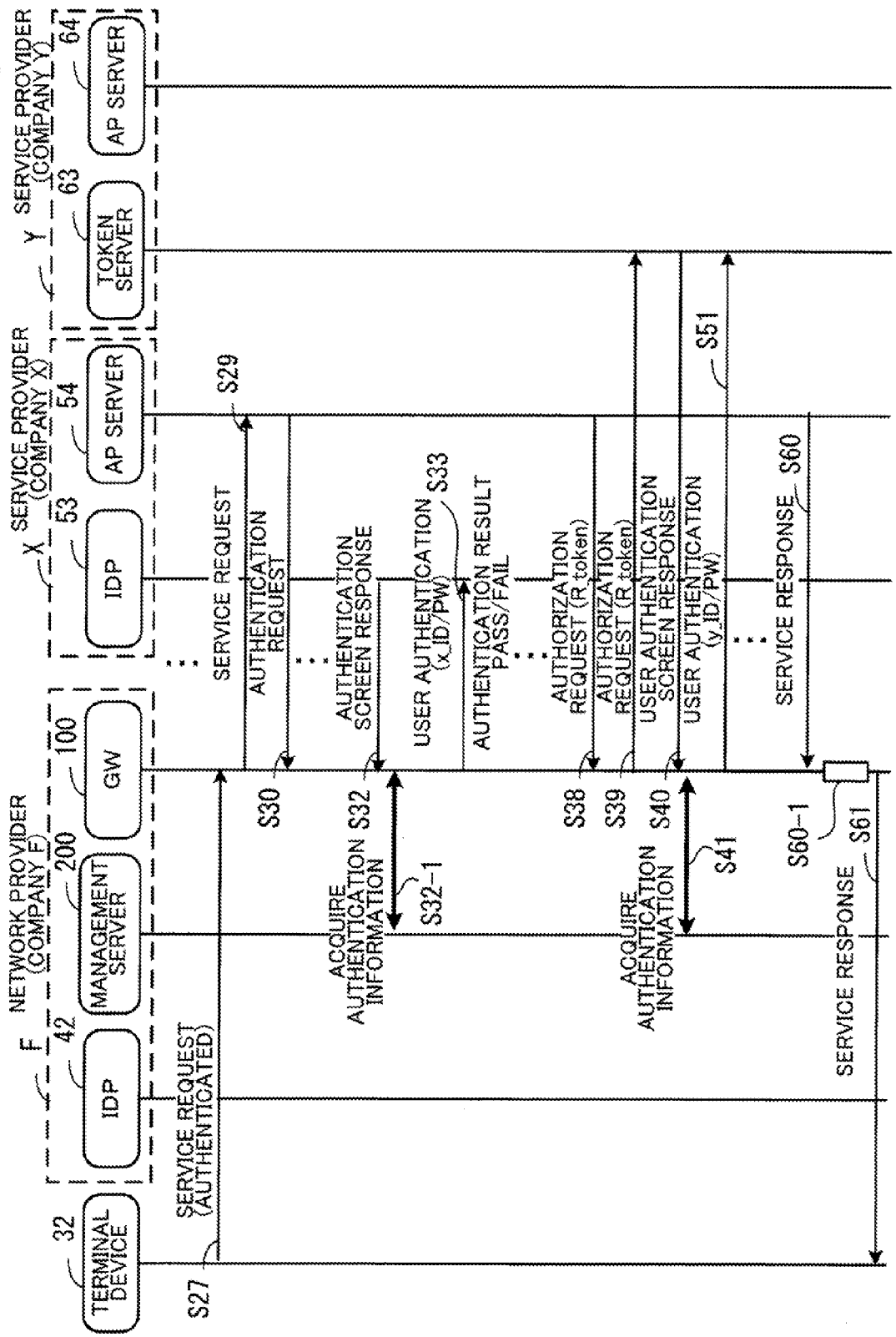
FIG. 15 is a sequence diagram of an example of a process for providing an unregistered collaboration service.

FIG. 15 is a sequence diagram of an example of a process for providing an unregistered collaboration service. FIG. 15 illustrates only different steps from the sequence diagram illustrated in FIGS. 12 and 13. In providing an unregistered collaboration service, steps S32-1, S41, and S60-1 are different from corresponding steps in the process illustrated in FIGS. 12 and 13. In providing an unregistered collaboration service, the step S28 in FIG. 12 is not executed. The steps different from those in FIGS. 12 and 13 will be described hereinafter.

[step S32-1] This step is executed after the step S32 and before the step S33 in FIG. 12.

In the step S32-1, upon receipt of the authentication screen data, the gateway apparatus 100 acquires authentication information from the management server 200. In doing this, the step S32-1 differs from the step S32 in that the gateway apparatus 100 sends a query designating only the URL of the identity provider 53 to the management server 200.

For example, in the gateway apparatus 100, the message transmission and reception unit 130 receives the authentication screen data, and transfers the same to the accepting unit 140. The accepting unit 140 passes the authentication screen data to the proxy authentication unit 170. The proxy authentication unit 170 searches the collaboration service table 111 for an entry associated with the combination of the tenant ID and the URL of the application server 54 corresponding to the message from the terminal device 32. At this time, the corresponding entry is not detected. Then, the proxy authentication unit 170 sets the URL of the identity provider 53 which has transmitted the authentication screen data as the URL to be queried.

The proxy authentication unit 170 further searches an entry from the authentication information management table 112 in which the tenant ID and the user ID indicated in the service request message from the terminal device 32 are included and the identity provider 53 is set as the service provider identity provider. If the corresponding authentication information has not been registered in the authentication information management table 112, the proxy authentication unit 170 transmits a request for acquiring authentication information to the query unit 160 via the accepting unit 140. Then, the query unit 160 queries the management server 200 about the authentication information corresponding to the identity provider of which the authentication information is not stored. In the management server 200, the authentication information-providing unit 220 transmits the authentication information to the gateway apparatus 100 in response to the query about the authentication information. In the gateway apparatus 100, the query unit 160 acquires the authentication information transmitted from the authentication information-providing unit 220. The query unit 160 transmits the acquired authentication information to the proxy authentication unit 170 via the accepting unit 140.

[step S41] This step is executed after the step S40 in FIG. 12 and before the step S51 in FIG. 13.

In the step S41, upon receipt of the user authentication screen data, the gateway apparatus 100 acquires authentication information from the management server 200. For example, in the gateway apparatus 100, the message transmission and reception unit 130 receives the user authentication screen data and transfers the same to the accepting unit 140. The accepting unit 140 transfers the user authentication screen data to the proxy authentication unit 170. The proxy authentication unit 170 sets the URL of the identity provider 63 which has transmitted the authentication screen data as the URL to be queried.

The proxy authentication unit 170 further searches the authentication information management table 112 for an entry in which the tenant ID and the user ID indicated in the service request message from the terminal device 32 are included and the identity provider 63 is set as the identity provider of the service provider. If the corresponding authentication information has not been registered in the authentication information management table 112, the proxy authentication unit 170 transmits a request for acquiring the authentication information to the query unit 160 via the accepting unit 140. Then, the query unit 160 queries the management server 200 about the authentication information corresponding to the identity provider of which the authentication information is not stored. In the management server 200, the authentication information-providing unit 220 transmits the authentication information to the gateway apparatus 100 in response to the query about the authentication information. In the gateway apparatus 100, the query unit 160 acquires the authentication information transmitted from the authentication information-providing unit 220. The query unit 160 transmits the acquired authentication information to the proxy authentication unit 170 via the accepting unit 140.

[step S60-1] This step is executed after the step S60 and before the step S61 in FIG. 13.

In the step S60-1, the respective URLs of identity providers as a linking collaborator and a linked collaborator of the newly recognized collaboration service are registered in the collaboration service table 111. For example, the collaboration table creation unit 180 acquires the information (cache data) held by the proxy authentication unit 170 by the process executed by the proxy authentication unit 170 in the step S27 et seq. (see FIG. 12). The cache data contains the tenant ID, the user ID, the service URL, and the respective URLs of the identity provider 53 and the identity provider 63. The collaboration table creation unit 180 determines whether or not an entry corresponding to the acquired tenant ID, user ID, service URL, and respective URLs of the identity provider 53 and the identity provider 63 has been registered in the collaboration service table 111. Then, if the corresponding entry has not been registered in the collaboration service table 111, the collaboration table creation unit 180 registers the entry containing the acquired tenant ID, user ID, service URL, and respective URLs of the identity provider 53 and the identity provider 63 in the collaboration service table 111.

As described above, when the process for providing the unregistered collaboration service is executed, the gateway apparatus 100 can learn the relationship in the collaboration service, and update the collaboration service table 111.

Figure 16:
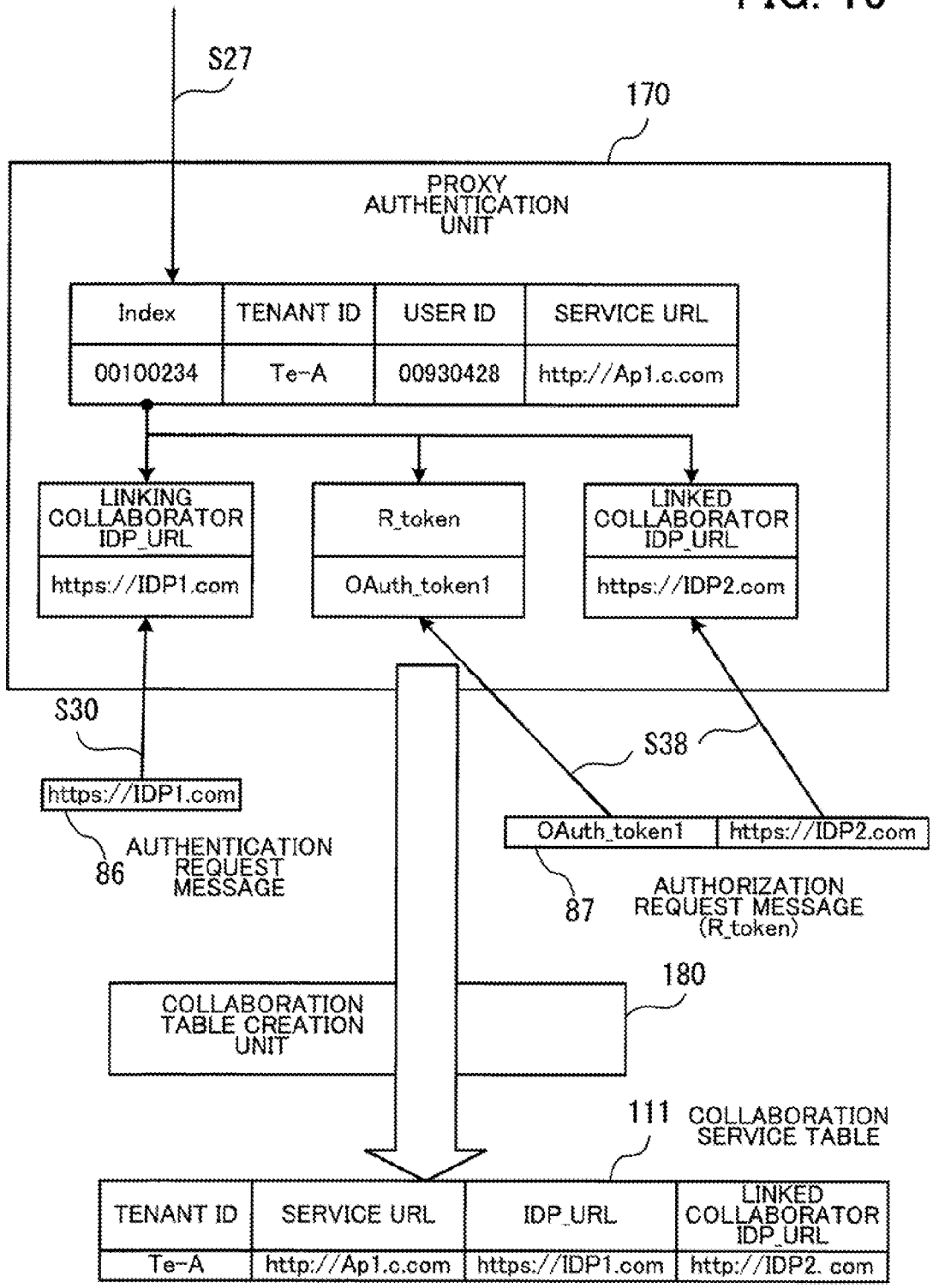
FIG. 16 illustrates an example of entry registration to the collaboration service table.

FIG. 16 illustrates an example of entry registration to the collaboration service table. For example, when the authenticated service request message 81 is received from the terminal device 32 in the step S27 (see FIG. 15), the proxy authentication unit 170 gives an index to the information in the service request message 81, and holds the information as cache data. The cache data is stored e.g. in the RAM 102. In the example illustrated in FIG. 16, the tenant ID "Te-A", the user ID "00930428", and the service URL "http://Ap1c.com" are cached in association with the index "00100234".

Thereafter, the proxy authentication unit 170 acquires an authentication request message 86 from the application server 54 in the step S30 (see FIG. 15). At this time, the proxy authentication unit 170 extracts the URL "https://IDP1.com" of the identity provider 53 from the authentication request message 86. Then, the proxy authentication unit 170 holds the extracted URL "https://IDP1.com" as the URL of the identity provider as the linking collaborator in association with the index "00100234".

Further, the proxy authentication unit 170 acquires a permission request message 87 from the application server 54 in the step S38 (see FIG. 15). At this time, the proxy authentication unit 170 extracts an unauthorized request token "OAuth_token1" and the URL "https://IDP2.com" of the identity provider 63 from the permission request message 87. Then, the proxy authentication unit 170 stores the extracted request token "OAuth_token1" in association with the index "00100234" in the cache data. Further, the proxy authentication unit 170 holds the extracted URL "https://IDP2.com" of the identity provider 63 as the URL of the identity provider as the linked collaborator in association with the index "00100234".

Thereafter, when the service response is received in the step S60 (see FIG. 15), the collaboration table creation unit 180 acquires the data cached by the proxy authentication unit 170. Then, the collaboration table creation unit 180 creates from the acquired data an entry in which the tenant ID, the service URL, and the respective URLs of the identity providers as the linking and linked collaborators are included, and stores the created entry in the collaboration service table 111.

As described above, it is possible to cause the gateway apparatus 100 to learn a plurality of services collaborating with each other. As a consequence, it is possible to save the administrator of the gateway apparatus 100 from the trouble of performing an operation for registering the collaboration service, which reduces the burden of the management.

By the way, the gateway apparatus 100 can detect that the request token is contained in the response message from the identity provider and thereby recognize that there is a collaboration service. The response message containing the request token is e.g. an HTTP document. In this case, it is possible to contain the request token in the HTTP header portion thereof.

Figure 17:
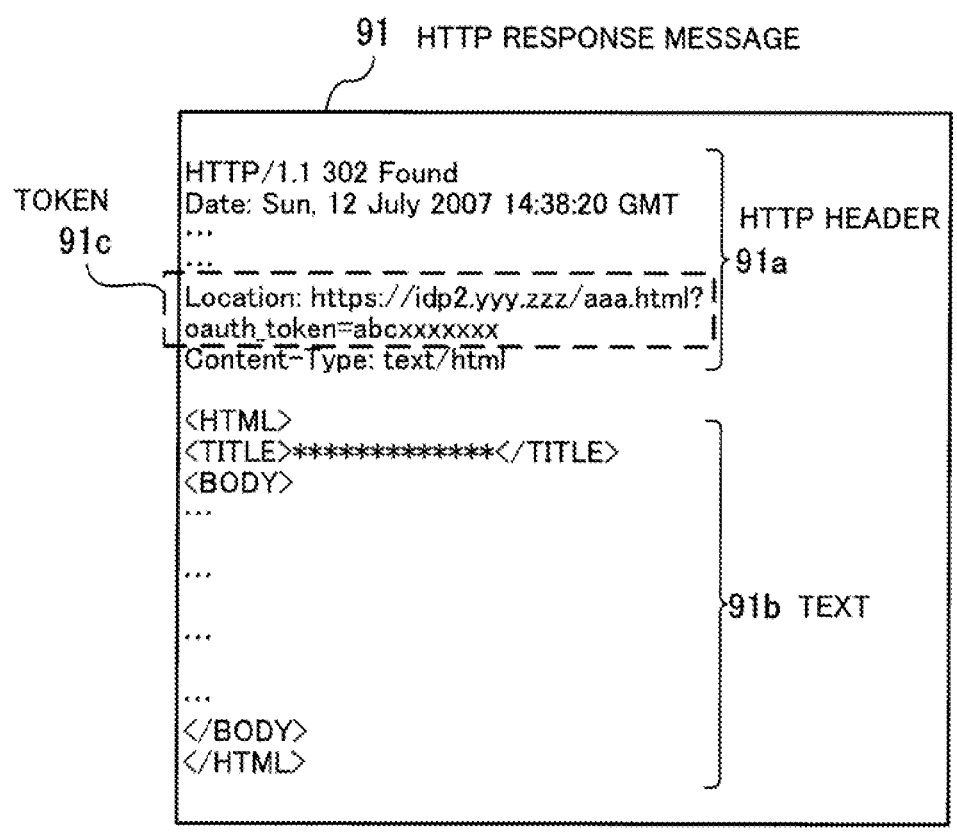
FIG. 17 illustrates an example of an HTTP response message containing an unauthorized request token.

FIG. 17 illustrates an example of an HTTP response message containing an unauthorized request token. The HTTP response message, denoted by reference numeral 91, contains an HTTP header 91a and a body 91b. A one-line space is provided between the HTTP header 91a and the body 91b.

The HTTP header 91a contains a token 91c. The token 91c contains the URL of the identity provider as the linked collaborator and identification information on the token 91c. In the step S38 illustrated in FIG. 15, the gateway apparatus 100 recognizes that the token 91c is contained in the HTTP response message 91 sent from the application server 54 as the permission request, and hence the collaboration service is to be executed.

When the user authentication and the access permission (authorization) are completed by the identity provider as the linked collaborator, the result of authentication is transmitted from the identity provider 63 to the gateway apparatus 100 e.g. by the HTTP response message containing the request token indicative of the access permission.

Figure 18:
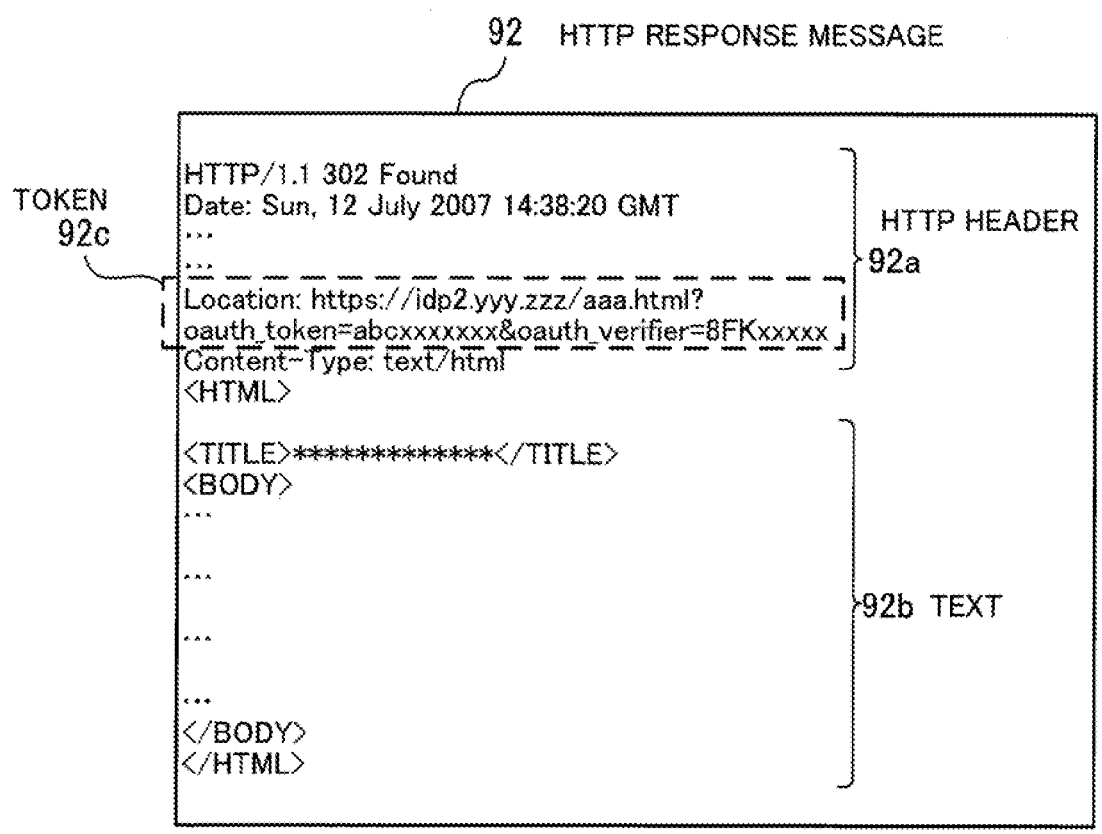
FIG. 18 illustrates an example of an HTTP response message containing a request token indicative of access permission.

FIG. 18 illustrates an example of an HTTP response message containing a request token indicative of access permission. Similarly to the HTTP response message 91 illustrated in FIG. 17, the HTTP response message, denoted by reference numeral 92, which contains the request token indicative of access permission also has an HTTP header 92a and a body 92b. The HTTP header 92a contains a token 92c. The authorized token 92c contains information "oauth_verifier=8FKxxxxx" indicating that the access has been authorized.

<Details of Processing Executed by the Gateway Apparatus 100 for Realizing the Operation and Learning Phases>

Next, a detailed description will be given of a process executed by the gateway apparatus when a message is received.

Figure 19:
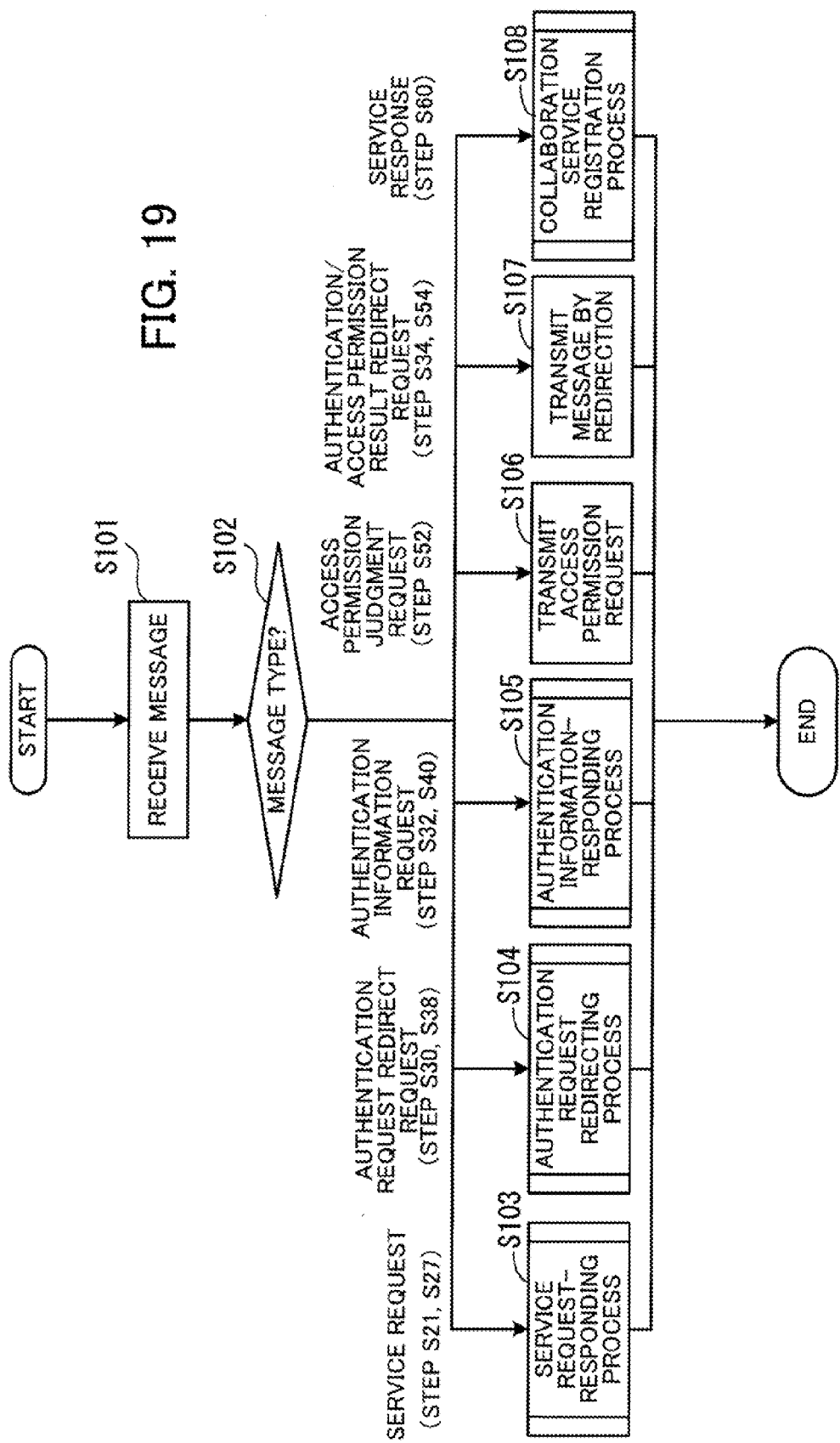
FIG. 19 is a flowchart of an example of a process executed by the gateway apparatus upon receipt of a message.

FIG. 19 is a flowchart of an example of the process executed by the gateway when a message is received. The process illustrated in FIG. 19 will be described hereinafter in order of step number.

[step S101] The gateway apparatus 100 receives a message. For example, the message transmission and reception unit 120 receives a message input via the network 21, and passes the received message to the accepting unit 140. Alternatively, the message transmission and reception unit 120 receives a message input via the network 22, and passes the received message to the accepting unit 140.

[step S102] The accepting unit 140 determines a type of the message. There are the following six types of messages:
service request (message in the step S21 or S27 in FIG. 12)
redirect request of an authentication request (message in the step S30 or S38 in FIG. 12)
authentication information request (message in the step S32 or S40 in FIG. 12)
access permission judgment request (message in the step S52 in FIG. 13)
redirect request of a result of authentication or access permission (message in the step S34 in FIG. 12 or step S54 in FIG. 13)
service response (message in the step S60 in FIG. 13)

When the received message is a service request message, the accepting unit 140 proceeds to a step S103. Further, when the received message is an authentication request message with a redirect instruction, the accepting unit 140 proceeds to a step S104. Further, when the received message is an authentication information request message, the accepting unit 140 proceeds to a step S105. Further, when the received message is an access permission judgment request message, the accepting unit 140 proceeds to a step S106. Further, when the received message is a response message of a result of authentication or access permission with a redirect instruction, the accepting unit 140 proceeds to a step S107. Further, when the received message is a service response, the accepting unit 140 proceeds to a step S108.

[step S103] The gateway apparatus 100 executes a service request-responding process. This process will be described in detail hereinafter (see FIG. 20).

[step S104] The gateway apparatus 100 executes an authentication request-redirecting process. This process will be described in detail hereinafter (see FIG. 21).

[step S105] The gateway apparatus 100 executes an authentication information-responding process. This process will be described in detail hereinafter (see FIG. 22).

[step S106] The gateway apparatus 100 responds to the access permission judgment request. For example, the access permission request message is passed from the accepting unit 140 to the proxy authentication unit 170. The proxy authentication unit 170 generates an access permission request message containing the cached request token (see FIG. 16), and passes the generated permission request message to the accepting unit 140. Then, the accepting unit 140 transmits the access permission request message to a sender of the access permission judgment request via the message transmission and reception unit 130.

[step S107] The gateway apparatus 100 transmits a message by redirection according to the redirect instruction in the received message. For example, when the received message is an authentication result message indicative of successful authentication (step S34 in FIG. 12), the accepting unit 140 transmits the authentication result to a redirect destination as an authenticated service request message according to the redirect instruction. Further, when the received message is an authentication result message indicative of successful authentication (step S54 in FIG. 13), the accepting unit 140 transmits the authentication result to a redirect destination as a permission completion notification message according to the redirect instruction.

[step S108] The gateway apparatus 100 executes a collaboration service registration process. This process will be described in detail hereinafter (see FIG. 23).

Next, detailed descriptions will be given of the steps S103, S104, S105, and S108, respectively.

First, the service request-responding process in the step S103 will be described.

Figure 20:
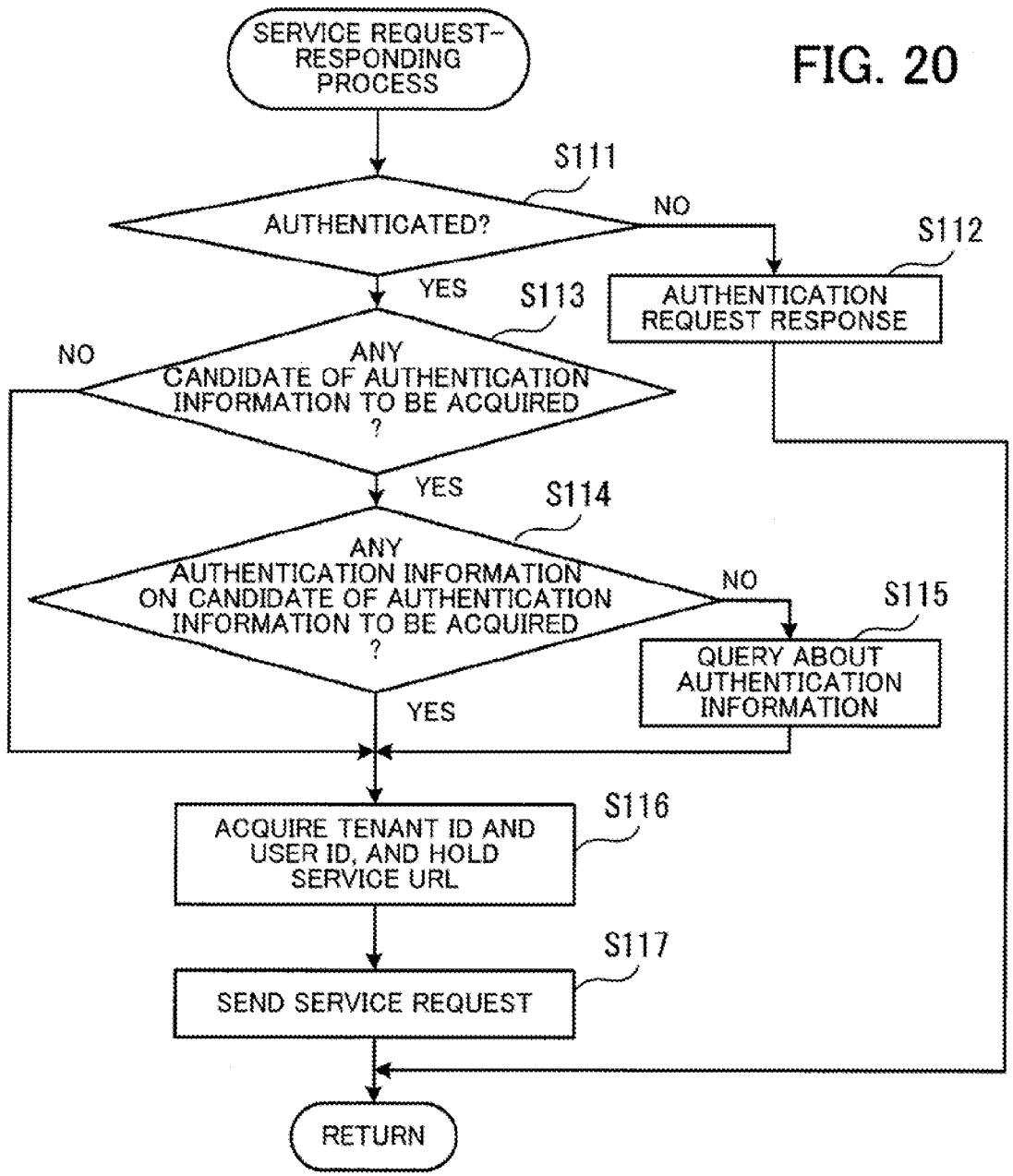
FIG. 20 is a flowchart of an example of a service request-handling process.

FIG. 20 is a flowchart of an example of the service request-responding process. The process illustrated in FIG. 20 will be described hereinafter in order of step number.

[step S111] Upon receipt of a service request message from one of the terminal devices, the gateway apparatus 100 determines whether or not pre-authentication by the identity provider 42 has already been performed for the terminal device. For example, the service request message is received by the message transmission and reception unit 120, and is passed to the accepting unit 140. The accepting unit 140 passes the service request message to the pre-authentication unit 150. The pre-authentication unit 150 determines whether or not the pre-authentication has been performed for the terminal device depending on whether or not the received service request message contains information indicating that the pre-authentication has been performed. If the pre-authentication has not been performed for the terminal device, the pre-authentication unit 150 proceeds to a step S112. For example, when the service request message in the step S21 in FIG. 12 is received, it is determined that the pre-authentication has not been performed. If the pre-authentication has been performed, the pre-authentication unit 150 proceeds to a step S113. For example, when the service request message in the step S27 in FIG. 12 is received, it is determined that the pre-authentication has been performed.

[step S112] If the pre-authentication has not been performed, the pre-authentication unit 150 responds an authentication request message to the terminal device as a sender of the service request message. For example, the pre-authentication unit 150 generates an authentication request message, and passes the generated authentication request message to the accepting unit 140. The accepting unit 140 transmits the acquired authentication request message to the terminal device via the message transmission and reception unit 120, followed by terminating the service request-responding process.

[step S113] If the pre-authentication has been performed, the gateway apparatus 100 determines whether or not there is any candidate of authentication information to be acquired in the collaboration service table 111. For example, the proxy authentication unit 170 of the gateway apparatus 100 acquires the authenticated service request message from the accepting unit 140. The proxy authentication unit 170 searches the collaboration service table 111 for an entry associated with the combination of the tenant ID and the service URL (URL of an application server) contained in the service request message. When the corresponding entry is found, the proxy authentication unit 170 combines the respective URLs in the columns of "IDP_URL" and "linked collaborator IDP_URL" of the corresponding entry with the tenant ID and the user ID indicated in the service request message. Then, the proxy authentication unit 170 extracts the combination of the tenant ID, the user ID, and the URLs, as a candidate of authentication information to be acquired, and determines that there is a candidate of authentication information to be acquired. Further, when the corresponding entry is not found, the proxy authentication unit 170 determines that there is no candidate of authentication information to be acquired. If there is any candidate of authentication information to be acquired, the proxy authentication unit 170 proceeds to a step S114. On the other hand, if there is no candidate of authentication information to be acquired, the proxy authentication unit 170 proceeds to a step S116.

[step S114] The proxy authentication unit 170 determines whether or not authentication information corresponding to the candidate(s) of authentication information to be acquired is stored in the authentication information management table 112. For example, the proxy authentication unit 170 searches the authentication information management table 112 for an entry associated with the combination of the tenant ID, user ID, and URLs indicated in each candidate of authentication information to be acquired. When the corresponding entries are found with respect to all of the candidates of authentication information to be acquired, the proxy authentication unit 170 determines that all items of authentication information set as the candidates to be acquired exist. On the other hand, when a corresponding entry is not found with respect to at least one of the candidates of authentication information to be acquired, the proxy authentication unit 170 determines that at least one of authentication information items set as the candidates to be acquired is missing. If all items of authentication information set as the candidates to be acquired exist, the proxy authentication unit 170 proceeds to the step 116. On the other hand, if a corresponding entry is not found with respect to at least one of the candidates of authentication information to be acquired, the proxy authentication unit 170 proceeds to a step S115.

[step S115] When there is any candidate of authentication information to be acquired without corresponding authentication information, the proxy authentication unit 170 queries the management server 200 about authentication information corresponding to each candidate of authentication information to be acquired without corresponding authentication information. For example, the proxy authentication unit 170 requests the query unit 160 to acquire the authentication information corresponding to the candidate of authentication information to be acquired via the accepting unit 140. Then, the query unit 160 transmits a query message designating the tenant ID, the user ID, and the URLs, which are indicated in the candidate of authentication information to be acquired, to the management server 200, and receives a response of the authentication information. The authentication information in the response is passed from the query unit 160 to the proxy authentication unit 170 via the accepting unit 140. The proxy authentication unit 170 stores the acquired authentication information in association with the tenant ID, user ID, and URLs in the candidate of authentication information to be acquired, in the authentication information management table.

[step S116] The proxy authentication unit 170 holds the tenant ID, user ID, and URL (service URL) contained in the service request message as cache data.

[step S117] The proxy authentication unit 170 transmits the service request message to the application server corresponding to the service URL. For example, the service request message is passed from the proxy authentication unit 170 to the accepting unit 140. Then, the service request message is transmitted from the accepting unit 140 to the application server via the message transmission and reception unit 130.

Next, a description will be given of the authentication request redirecting process in the step S104.

Figure 21:
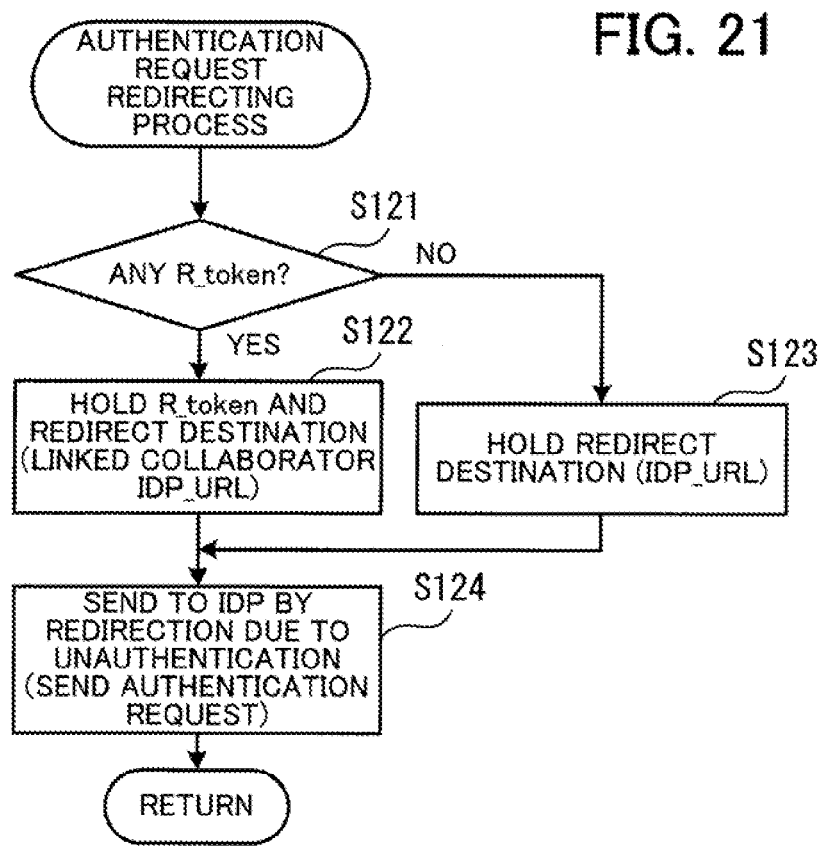
FIG. 21 is a flowchart of an example of an authentication request redirecting process.

FIG. 21 is a flowchart of an example of the authentication request redirecting process. The process illustrated in FIG. 21 will be described hereinafter in order of step number.

[step S121] When an authentication request message with a redirect instruction is received, the gateway apparatus 100 determines whether or not the message contains a request token (R_token). For example, the proxy authentication unit 170 of the gateway apparatus 100 acquires an authentication request message from the accepting unit 140. Then, if a request token is contained in the authentication request message, the proxy authentication unit 170 proceeds to a step S122. On the other hand, if no request token is contained in the authentication request message, the proxy authentication unit 170 proceeds to a step S123. Note that an authentication request message containing a request token is a permission request message in OAuth.

[step S122] If the received authentication request message is a permission request message containing a request token, the proxy authentication unit 170 recognizes that a requested service is a collaboration service. Then, the proxy authentication unit 170 holds the request token and the URL of the application server as the redirect destination (URL of the identity provider as the linked collaborator) as cache data. Thereafter, the proxy authentication unit 170 proceeds to step S124.

[step S123] If the received authentication request message is not a permission request message containing a request token, the proxy authentication unit 170 holds the URL of the redirect destination (URL of the identity provider) as cache data.

[step S124] The proxy authentication unit 170 transmits the authentication request by redirection.

Next, a description will be given of the authentication information-responding process in the step S105.

Figure 22:
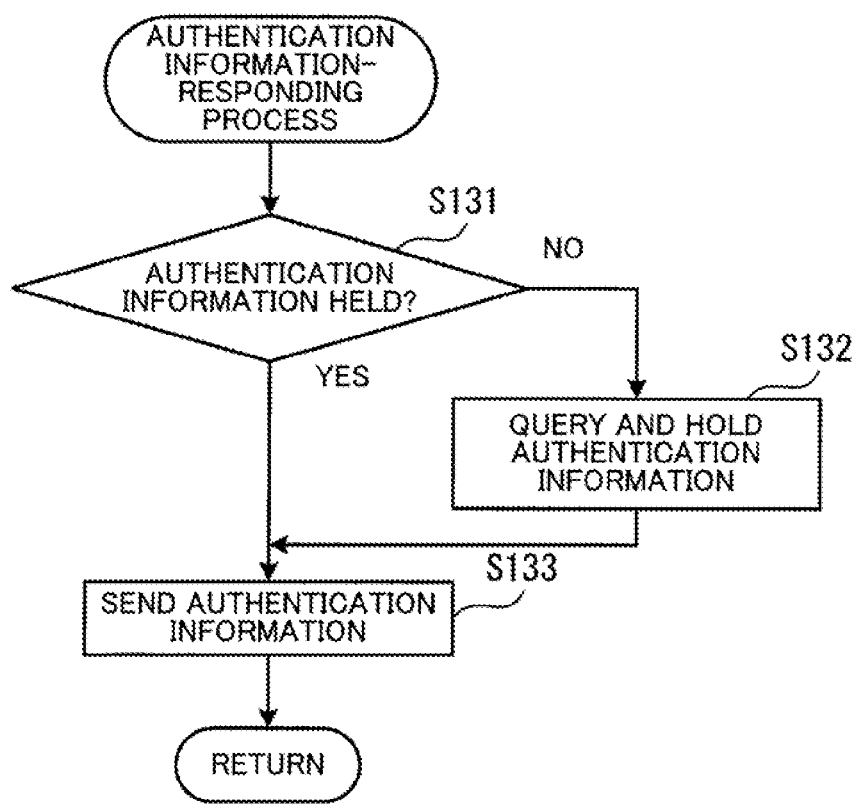
FIG. 22 is a flowchart of an example of an authentication information response process.

FIG. 22 is a flowchart of an example of the authentication information-responding process. The process illustrated in FIG. 22 will be described hereinafter in order of step number.

[step S131] Upon receipt of the authentication information request message, the proxy authentication unit 170 of the gateway apparatus 100 determines whether or not the requested authentication information is held. For example, the proxy authentication unit 170 searches the authentication information management table 112 for an entry associated with the combination of the tenant ID, the user ID, and the URL of the identity provider. If the corresponding entry is detected, the proxy authentication unit 170 judges that the authentication information is held. On the other hand, if the corresponding entry is not detected, the proxy authentication unit 170 judges that the authentication information is not held. If the authentication information is held, the proxy authentication unit 170 proceeds to a step S133. On the other hand, if the authentication information is not held, the proxy authentication unit 170 proceeds to a step S132.

[step S132] The proxy authentication unit 170 requests the query unit 160 to send a query about the authentication information via the accepting unit 140. Then, the query unit 160 queries the management server 200 about the authentication information, and acquires the authentication information from the management server 200. The query unit 160 transmits the acquired authentication information to the proxy authentication unit 170 via the accepting unit 140. The proxy authentication unit 170 generates one entry by associating the acquired authentication information with the tenant ID, the user ID, and the URL of the identity provider, and stores the generated entry in the authentication information management table 112.

[step S133] The proxy authentication unit 170 delivers the authentication information. For example, when the authentication information has been already held, the proxy authentication unit 170 acquires the requested authentication information from the authentication information management table 112, and transmits the acquired authentication information to the identity provider as the sender of the authentication information request message. On the other hand, when the authentication information has not been held, the proxy authentication unit 170 transmits the authentication information acquired in the step S132 to the identity provider as the sender of the authentication information request message.

Next, a description will be given of the collaboration service registration process in the step S108.

Figure 23:
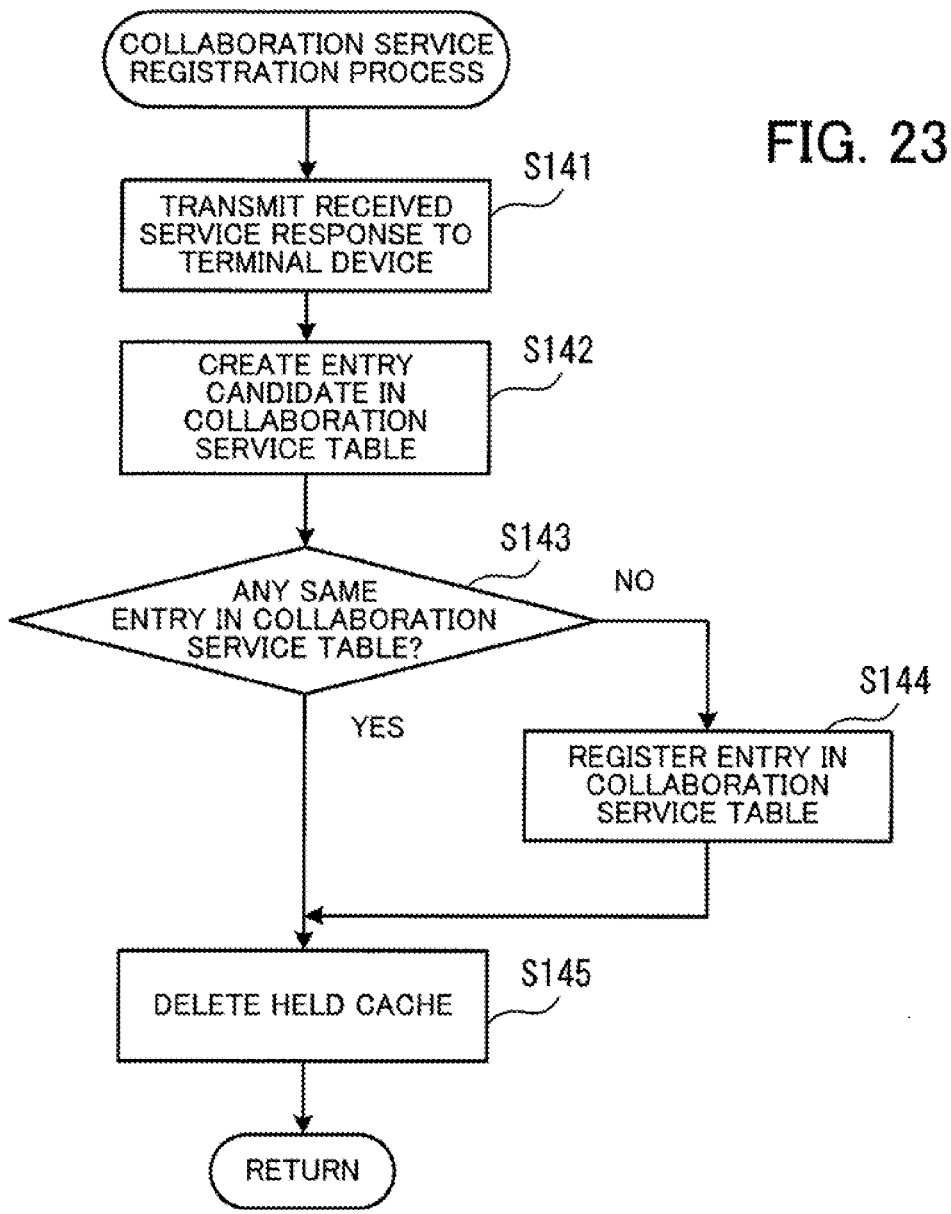
FIG. 23 is a flowchart of an example of a collaboration service registration process.

FIG. 23 is a flowchart of an example of the collaboration service registration process. The process illustrated in FIG. 23 will be described hereinafter in order of step number.

[step S141] The gateway apparatus 100 transmits the received service response message to the terminal device as a sender of the corresponding service request message. For example, the accepting unit 140 of the gateway apparatus 100 transmits the service response message via the message transmission and reception unit 120 as a response to the service request message, which has been received via the message transmission and reception unit 130.

[step S142] The gateway apparatus 100 creates an entry candidate to the collaboration service table. For example, the collaboration table creation unit 180 of the gateway apparatus 100 acquires the tenant ID, the service URL, the URL of the identity provider as the linking collaborator, and the URL of the identity provider as the linked collaborator from the cache data held by the proxy authentication unit 170, and collectively sets the acquired information as one entry candidate.

[step S143] The collaboration table creation unit 180 determines whether or not there is an entry having the same content as that of the entry candidate in the collaboration service table 111. If the corresponding entry has already been registered, the collaboration table creation unit 180 proceeds to a step S145. If the corresponding entry is not found, the collaboration table creation unit 180 proceeds to a step S144.

[step S144] The collaboration table creation unit 180 registers the entry candidate created in the step S142 in the collaboration service table 111.

[step S145] The proxy authentication unit 170 deletes the held cache data.

As described above, the frequency of acquisition of authentication information from the management server 200 performed in proxy authentication for collaboration services is reduced, whereby it is possible to improve the processing efficiency. More specifically, when a service request message is received for a known collaboration service, the gateway apparatus 100 collectively acquires from the management server 200 a plurality of authentication information items which are to be transmitted respectively to a plurality of service providers that provide the collaboration service. This makes it possible to reduce the frequency of communication between the gateway apparatus 100 and the management server 200, compared with a case where each authentication information item is individually acquired from the management server 200 each time authentication information is requested from the identity provider of each service provider.

For example, there is a case where an SSL (Secure Socket Layer) session is set up between the gateway apparatus 100 and the management server 200 each time a query is made, for the purpose of ensuring safety of authentication information. Processing for setting up an SSL session is complicated, and further, the processing load on the gateway apparatus 100 and the management server 200 is heavy. By reducing the frequency of setting-up of connection for the SSL session, it is possible to reduce the processing load on the gateway apparatus 100 and the management server 200.

Further, to set-up connection for an SSL session, not only query messages and authentication information which are transmitted and received, but also various information items for ensuring safety are exchanged between the gateway apparatus 100 and the management server 200. For this reason, by reducing the frequency of setting up connection for an SSL session, the amount of communication between the gateway apparatus 100 and the management server 200 is also reduced.

What is more, the authentication information once acquired is stored in the authentication information management table 112, which makes it unnecessary to acquire the authentication information from the management server 200 when a user who has ever made use of a collaboration service transmits a service request message for the same collaboration service again. As a consequence, it is possible to further reduce the frequency of communication between the gateway apparatus 100 and the management server 200.

Further, when a collaboration service is provided, the gateway apparatus 100 can learn the combination of a linking collaborator and a linked collaborator in the collaboration service. This saves the administrator of the gateway apparatus 100 time and labor for registering an entry in the collaboration service table 111, and reduces the management load on the gateway apparatus 100.

Further, by creating an entry not on a user-by-user basis but on a tenant-by-tenant basis for the collaboration service table 111, it is possible to reduce the amount of memory and the number of times of table search processing. For example, the number of users in a company is sometimes immense (e.g. several tens of thousands). In this case, if entries are registered in the collaboration service table 111 on a user-by-user basis, the number of entries is proportional to the number of users, which results in an enormous amount of data in the collaboration service table 111. On the other hand, if entries are registered in the collaboration service table 111 on a tenant-by-tenant basis, it is possible to reduce the amount of data. If the amount of data in the collaboration service table 111 is small, load of search processing in searching the collaboration service table 111 for an entry is also reduced.

[c] Other Embodiments

Although in the second embodiment, authentication information is a combination of a user ID and a password, other authentication information may be used. For example, in place of the password, biometric authentication information, such as information on the veins on a palm or information on a fingerprint of a user, may be used.

Further, although in the second embodiment, an identity provider is provided in each service provider separately from an application server thereof, the function of the identity provider may be implemented in the application server. In this case, for example, the application server 54 having the authentication function transmits an authentication screen in response to the service request in the step S29 without performing the processing for redirecting the authentication request in the step S30 illustrated in FIG. 12. In the gateway apparatus 100, when an authentication screen is transmitted from the application server 54 in response to the service request, it is possible to recognize the application server 54 as the indent provider of the linking collaborator by holding the URL of the application server 54 as the URL of identity provider of the linking collaborator.

Further, although in the above-described second embodiment, collaboration processing for providing a service is executed by two servers, there is a case where collaboration processing is executed by three or more servers. In this case, by providing a plurality of columns of linked collaborator IDP_URL in the collaboration service table 111 illustrated in FIG. 10, it is possible to hold the relationship between the servers in the service provided by collaboration processing executed by three or more servers. Further, when the gateway apparatus 100 queries the management server 200 about authentication information, an URL of each identity provider associated with a combination of a tenant ID and a service URL in the collaboration service table 111 is caused to be included in the query message. However, it is not necessary to cause authentication information which has been registered in the authentication information management table 112 to be included in the query message.

Note that it is possible to realize the processing functions described in the embodiments by a computer. In this case, a program is provided which describes contents of processing of functions of the proxy server 1, the management server 2, the gateway apparatus 100, and the management server 200. By carrying out the program by the computer, the above-described processing functions are realized on the computer. The program describing the contents of processing can be recorded in a record medium which is capable of being read by the computer. Examples of the record medium which is capable of being read by the computer include a magnetic recording system, an optical disk, a magnetooptical medium, a semiconductor memory or the like. Examples of the magnetic recording system include a hard disk device (HDD), a flexible disk (FD), a magnetic tape. Examples of the optical disk include a DVD (Digital Versatile Disc), a DVD-RAM, a CD-ROM/RW. Examples of the magnetooptical medium include an MO (Magneto-Optical disc).

In case of distributing programs, for example, portable record mediums, such as DVD, CD-ROM or the like in which the program is recorded are marketed. Further, it is also possible to store the program in a storing device of a server computer, and transfer the program from the server computer to the other computer via a network.

The computer which carries out the program stores, for example, the program which is recorded in the portable record medium, or is transferred from the server computer in the storing device thereof. Then, the computer reads out the program from the storing device thereof, and carries out the processes according to the program. Note that the computer is also capable of directly reading out the program from the portable record medium, and carrying out the processes according to the program. Further, the computer is also capable of carrying out the processes according to the program which is received, each time the program is transferred from the server computer.

Further, it is possible to realize at least part of the above-described processing functions by an electronic circuit, such as a DSP (Digital Signal Processor), an ASIC (Application Specific Integrated Circuit), or a PLD (Programmable Logic Device).

The processing efficiency in the proxy processing is improved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. A system including a proxy server configured to perform, as a proxy, a procedure of user authentication by at least two processing systems that perform processing for a service in collaboration with each other, and a management server configured to manage authentication information items for user authentication by said at least two processing systems,
wherein the proxy server comprises:
a first memory configured to store a correspondence relationship between a service identifier identifying a service, and processing system identifiers identifying at least two processing systems that perform processing for the service in collaboration with each other, respectively; and
one or more first processors configured to perform a first procedure comprising:
transmitting a first service request designating a first service identifier to a first processing system;

when a first authentication request for the first processing system is transmitted from the first processing system to which the first service request has been transmitted as a response, holding the first service identifier indicated in the first service request, and a first processing system identifier identifying the first processing system which is a sender of the first authentication request as cache data;

when a second authentication request for a second processing system as a linked collaborator is transmitted from the first processing system, storing, in the cache data, a second processing system identifier identifying the second processing system which is the linked collaborator indicated by the second authentication request in association with the first service identifier and the first processing system identifier;

when a response to the first service request is transmitted from the first processing system, storing, in the first memory, the first service identifier, the first processing system identifier and the second processing system identifier which are included in the cache data;

responsive to a second service request designating the first service identifier, reading processing system identifiers which correspond to the first service identifier, from the first memory; and transmitting an acquisition request containing the processing system identifiers to the management server, wherein the management server comprises:

a second memory configured to store a correspondence relationship between processing system identifiers identifying processing systems, respectively, and authentication information items used for user authentication by the processing systems, respectively; and one or more second processors configured to perform a second procedure comprising:

receiving the acquisition request from the proxy server; and acquiring, from the second memory, the authentication information items which correspond to the processing system identifiers contained in the received acquisition request, respectively, and transmitting the acquired authentication information items to the proxy server, and wherein the first procedure further comprises:

receiving, from the management server, the authentication information items which correspond to the processing system identifiers, respectively; and transmitting user authentication requests each containing one of the received authentication information items for the first or second processing system to the first and second processing systems, respectively.

2. The system according to claim 1, wherein the first procedure further comprises:

storing authentication information items received from the management server in association with respective corresponding processing system identifiers, in the first memory and wherein the transmitting of the acquisition request to the management server transmits, to the management server, the acquisition request which contains a processing system identifier for which an associated authentication information item is not stored in the first memory, out of the processing system identifiers of the first and second processing systems read from the first memory.

3. The system according to claim 1, wherein:

in association with an organization identifier identifying an organization to which users belong, the first memory stores a correspondence relationship between a service identifier identifying a service which is available to the users in the organization and processing system identifiers identifying at least two processing systems that perform processing for the service in collaboration with each other, respectively; and in response to a third service request designating an organization identifier identifying an organization to which users belong and a second service identifier, the transmitting of the acquisition request to the management server reads, from the first memory, at least two processing system identifiers corresponding to a combination of the organization identifier and the second service identifier, and transmits an acquisition request containing the read at least two processing system identifiers to the management server.

4. The system according to claim 1, wherein:

the processing system identifier stored in the first memory of the proxy server and in the second memory of the management server is an identifier of an authentication device that performs user authentication within a processing system; and the transmitting of the user authentication requests transmits the user authentication requests to the respective authentication apparatuses of the first and second processing systems.

5. The system according to claim 1, wherein the proxy server is a gateway provided between a network to which are connected terminal devices that output service requests to processing systems, and a network to which the processing systems are connected.

6. A method of managing authentication information by a proxy server configured to perform, as a proxy, a procedure of user authentication by at least two processing systems that perform processing for a service in collaboration with each other, and a management server configured to manage authentication information items to be transmitted to said at least two processing systems, the method comprising:

a first procedure executed by the proxy server, comprising:

transmitting a first service request designating a first service identifier identifying a service that is to be provided to a first processing system;

when a first authentication request for the first processing system is transmitted from the first processing system to which the first service request has been transmitted as a response, holding the first service identifier indicated in the first service request, and a first processing system identifier identifying the first processing system which is a sender of the first authentication request as cache data;

when a second authentication request for a second processing system as a linked collaborator is transmitted from the first processing system, storing, in the cache data, a second processing system identifier identifying the second processing system which is the linked collaborator indicated by the second authentication request in association with the first service identifier and the first processing system identifier;

when a response to the first service request is transmitted from the first processing system, storing, in the first memory, the first service identifier, the first processing system identifier and the second processing system identifier which are included in the cache data;

reading, in response to a second service request designating the first service identifier, from the first memory, processing system identifiers which correspond to the first service identifier designated by the second service request; and transmitting an acquisition request containing the processing system identifiers to the management server; and a second procedure executed by the management server, comprising:

receiving the acquisition request from the proxy server; and acquiring, from a second memory configured to store a correspondence relationship between processing system identifiers identifying processing systems, respectively, and authentication information items used for user authentication by the processing systems, respectively, the authentication information items which correspond to the processing system identifiers contained in the received acquisition request, respectively, and transmitting the acquired authentication information items to the proxy server, wherein the first procedure further comprises:

receiving, from the management server, the authentication information items which correspond to the processing system identifiers, respectively; and transmitting user authentication requests each containing one of the received authentication information items for the first or second processing system to the first and second processing systems, respectively.

7. A computer-readable, non-transitory medium encoded with a computer program, the computer program causing a computer to perform a procedure comprising:

transmitting a first service request designating a first service identifier identifying a service that is to be provided to a first processing system;

when a first authentication request for the first processing system is transmitted from the first processing system to which the first service request has been transmitted as a response, holding the first service identifier indicated in the first service request, and a first processing system identifier identifying the first processing system which is a sender of the first authentication request as cache data;

when a second authentication request for a second processing system as a linked collaborator is transmitted from the first processing system, storing, in the cache data, a second processing system identifier identifying the second processing system which is the linked collaborator indicated by the second authentication request in association with the first service identifier and the first processing system identifier;

when a response to the first service request is transmitted from the first processing system, storing, in the first memory, the first service identifier, the first processing system identifier and the second processing system identifier which are included in the cache data;

reading, in response to a second service request designating the first service identifier, from the memory, processing system identifiers which correspond to the first service identifier designated by the second service request; and transmitting an acquisition request containing the processing system identifiers to a management server;

receiving, from the management server, the authentication information items which correspond to the processing system identifiers, respectively; and transmitting user authentication requests each containing one of the received authentication information items for the first or second processing system to the first and second processing systems, respectively.

* * * * *